(12) United States Patent
Wexler et al.

(10) Patent No.: US 11,048,764 B2
(45) Date of Patent: Jun. 29, 2021

(54) MANAGING UNDER—AND OVER-REPRESENTED CONTENT TOPICS IN CONTENT POOLS

(71) Applicant: Yahoo Holdings, Inc., Sunnyvale, CA (US)

(72) Inventors: Michael Carey Wexler, Mountain View, CA (US); Don Matheson, Denver, CO (US)

(73) Assignee: Verizon Media Inc., New York, NY (US)

( * ) Notice: Subject to any disclaimer, the term of this patent is extended or adjusted under 35 U.S.C. 154(b) by 273 days.

(21) Appl. No.: 15/394,995

(22) Filed: Dec. 30, 2016

(65) Prior Publication Data

US 2018/0189289 A1 Jul. 5, 2018

(51) Int. Cl.
*G06F 16/9535* (2019.01)
*G06F 16/954* (2019.01)

(52) U.S. Cl.
CPC ........ *G06F 16/9535* (2019.01); *G06F 16/954* (2019.01)

(58) Field of Classification Search
None
See application file for complete search history.

(56) References Cited

U.S. PATENT DOCUMENTS

2004/0044790 A1* 3/2004 Loach .................... H04L 29/06 709/241
2004/0243570 A1* 12/2004 Gross .................... G06Q 10/06
2007/0005563 A1* 1/2007 Aravamudan .......... G06F 16/40
2012/0016642 A1* 1/2012 Li .......................... G06Q 30/02 703/2
2016/0188725 A1* 6/2016 Wang ................. G06F 16/9535 707/734
2019/0034706 A1* 1/2019 el Kaliouby ........ G06K 9/00288

OTHER PUBLICATIONS

Li et al., A contextual-bandit approach to personalized news article recommendation Apr. 30, 10, WWW '10, pp. 661-670.*
Shin et al., Weighted Penalty Model for Content Balancing in CATS Apr. 2009, Person, 17 pages.*

* cited by examiner

*Primary Examiner* — Jason G Liao
(74) *Attorney, Agent, or Firm* — Pillsbury Winthrop Shaw Pittman LLP

(57) ABSTRACT

The present teaching, which includes methods, systems and computer-readable media, relates to techniques to manage representation of a content topic in a content pool. The disclosed techniques may include determining availability of content related to the content topic based on a set of content items in the content pool, and determining a level of interest of a set of users in the content topic based at least on information related to interaction of the set of users with the set of content items. A level of representation of the content topic in the content pool may be determined based at least on the determined availability of content and the determined level of interest. Based on the level of representation, at least some of the set of content items related to the content topic may be updated, e.g., content items may be added to or removed from the content pool.

21 Claims, 26 Drawing Sheets

MANAGING UNDER—AND OVER-REPRESENTED CONTENT TOPICS IN CONTENT POOLS

BACKGROUND

1. Technical Field

The present teaching relates to managing content. Specifically, the present teaching relates to techniques for managing representation of a content topic in a content pool including online content.

2. Discussion of Technical Background

The Internet has made it possible for a user to electronically access virtually any content at any time and from any location. With the explosion of information, it has become increasingly important to provide users with information that is relevant to the user and not just information in general. Further, as users of today's society rely on the Internet as their source of information, entertainment, and/or social connections, e.g., news, social interaction, movies, music, etc., it is critical to provide users with information they find valuable.

Efforts have been made to attempt to allow users to readily access relevant and on the point content. For example, an effort in attempting to enable users to easily access relevant content is via personalization, which aims at understanding each user's individual likings/interests/preferences so that an individualized user profile for each user can be set up and can be used to select content that matches a user's interests. The underlying goal is to meet the minds of users in terms of content consumption. User profiles traditionally are constructed based on users' personal information and users' declared interests and/or inferred from, e.g., users' demographics. There have also been systems that identify users' interests based on observations made on users' interactions with content. A typical example of such user interaction with content is clicking on content which is measured by Click Through Rate (CTR).

One way to allow users to access relevant content is to pool content that is determined to be of interest to users. However, given the explosion of information on the Internet, it may not be possible to evaluate all content accessible via the Internet whenever there is a need to select content relevant to a particular user. Thus, realistically, it is needed that a subset or a pool of the Internet content may be pooled or collected based on some criteria so that content can be selected from this pool and recommended to users based on their interests for consumption.

Typically, a content pool may include content items related to multiple different topics (e.g., sports, politics, etc.). However, the number or amount of content items for each content topic available in the pool may not match a demand for that content topic as indicated by user profiles/interests. For example, certain content topics may be misrepresented in the content pool in that they may be under-represented with a fewer number of content items related to the content topic relative to a high demand for that content topic as exhibited by the users. Similarly, certain topics may be over-represented with a larger number of content items related to the content topic relative to a low demand for that content topic by the users.

Given such under- and over-representation of content topics, users may not be served well with enough relevant content to provide them with a satisfactory experience with the content provider. Further, given that content providers (e.g., website portals, etc.) typically may have a limited budget for the content they create or license, misrepresentation of content topics in the pool may mean that they are unnecessarily spending money on content topics that their users don't want and are not spending enough on topics in which the users have exhibited higher interest.

Therefore, there is a need for improvements over the conventional approaches to managing representation of content topics in a content pool.

SUMMARY

The present teaching relates to methods, systems, and programming for managing representation of a content topic in a content pool.

In one example, a method to manage representation of a content topic, implemented on a machine having a processor, a storage unit, and a communication platform capable of making a connection to a network is disclosed. The method may include determining, using the processor, availability of content related to the content topic based on a set of content items in a content pool; determining, using the processor, a level of interest of a set of users in the content topic based at least on information related to interaction of the set of users with the set of content items, determining, using the processor, a level of representation of the content topic in the content pool based at least on the availability and the level of interest; and updating, using the processor, at least some of the set of content items in the content pool related to the content topic based on the level of representation of the content topic.

In another example, a system to manage representation of a content topic in a content pool is disclosed. The system may include a communication platform, an availability determiner, an interest determiner, a representation-level determiner, and a content pool manager. The communication platform may be configured to receive information related to a set of content items in a content pool and information related to interaction of a set of users with the set of content items. The availability determiner may be configured to determine availability of content related to the content topic based on a set of content items in a content pool. The interest determiner may be configured to determine a level of interest of a set of users in the content topic based at least on the information related to interaction of the set of users with the set of content items. The representation-level determiner may be configured to determine a level of representation of the content topic in the content pool based at least on the availability and the level of interest; and the content pool manager may be configured to update at least some of the set of content items in the content pool related to the content topic based on the level of representation of the content topic.

Other concepts relate to software to implement the present teachings on managing representation of a content topic. A software product, in accord with this concept, includes at least one machine-readable non-transitory medium and information carried by the medium. The information carried by the medium may be executable program code data, and/or parameters in association with the executable program code, etc.

In one example, a machine-readable, non-transitory and tangible medium having data recorded thereon for managing representation of a content topic, where the information, when read by the machine, causes the machine to perform a plurality of operations. Such operations may include determining availability of content related to the content topic based on a set of content items in a content pool; determining a level of interest of a set of users in the content topic based at least on information related to interaction of the set of users with the set of content items, determining a level of representation of the content topic in the content pool based at least on the availability and the level of interest; and updating at least some of the set of content items in the content pool related to the content topic based on the level of representation of the content topic.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
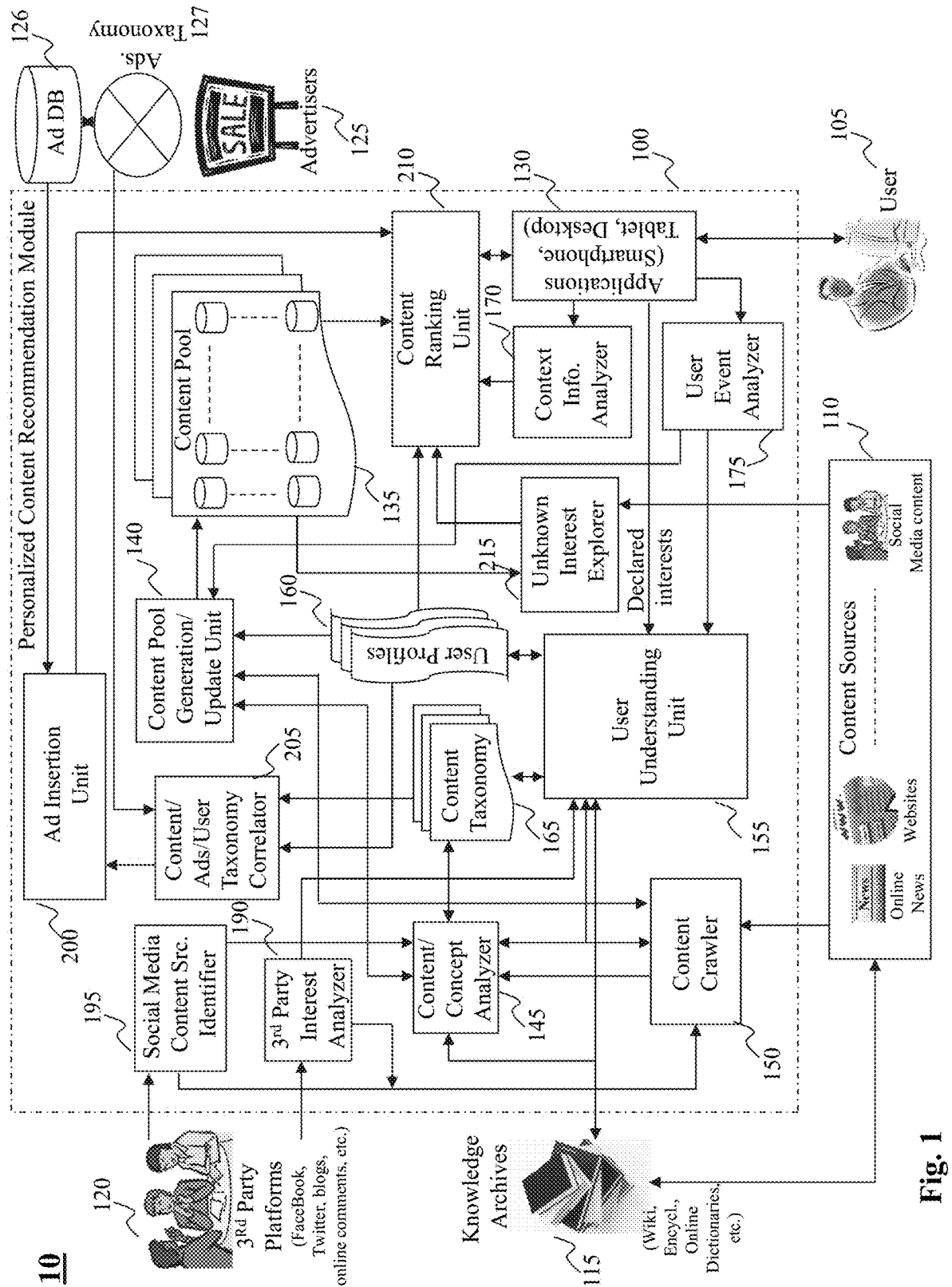
FIG. 1 depicts an exemplary system diagram for personalized content recommendation, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to managing representation of a content topic. Particularly, the present teaching relates to a system, method, and/or programs for managing representation of a content topic in a content pool that addresses the shortcomings associated the conventional content pooling, and managing how content topics in content pools are properly represented. Techniques provided in the present disclosure are related to and may be implemented in relation to techniques for personalizing on-line content recommendations to a user and building content pools for personalized user recommendations as discussed below.

An aspect of recommending quality personalized content is to build a content pool with quality content that covers subject matters interesting to users. For example, a content pool may include content items related to multiple different topics (e.g., sports, politics, etc.) and sub-topics (e.g., superbowl under the sports topics, prudential election under the politics topics and/or other topics related to specific people, events, etc.). Further, the content topics may be associated with one of many different content types (e.g., based on sentiments, such as, funny content, sad content, sarcastic content, etc.) or associated with one of many different entities (e.g., a specific publisher, a specific website, a specific advertiser, etc.). Content in a content pool may be originally generated or created by the content provider themselves, or may be licensed by content providers from third-party content sources. Content in the content pool may be rated in terms of the subject and/or the performance of the content itself. For example, a content item can be characterized in terms of "topics" or "concepts" it discloses and such a characterization may be generated with respect to the universal interest space, e.g., defined via concept archive(s) such as content taxonomy and/or Wikipedia and/or online encyclopedia. (The terms "topic" and "concept" are used interchangeably in this disclosure.) For example, each content item can be characterized via a high dimensional vector with each attribute of the vector corresponding to a topic in the interest universe and the value of the attribute indicates whether and/or to what degree the content covers the topic. When content item is characterized in the same universal interest space as that for user's profile, the affinity between the content and a user profile can be efficiently determined.

Each content item in the content pool can also be individually characterized in terms of other criteria. For example, performance-related measures, such as popularity of the content, may be used to describe the content. Performance related characterizations of content may be used in both selecting content to be incorporated into the content pool as well as selecting content already in the content pool for recommendation of personalized content for specific users. Such performance oriented characterizations of each content item may change over time and can be assessed periodically and can be done based on users' activities. Content pool also changes over time based on various reasons such as new content becoming available, old content expiring, content performance, change in users' interests, etc. Dynamically changed performance characterization of content in the content pool may also be evaluated periodically or dynamically based on performance measures of the content so that the content pool can be adjusted over time, i.e., by removing low performance content pieces, adding new content with good performance, or updating content.

To grow the content pool, the present teaching discloses ways to continually discover both new content and new content sources from which interesting content may be accessed, evaluated, and incorporated into the content pool. New content may be discovered dynamically via accessing information from third party applications which users use and exhibit various interests. Examples of such third party applications include Facebook, Twitter, Microblogs, or YouTube. New content may also be added to the content pool when some new interest or an increased level of interests in some subject matter emerges or is predicted based on the occurrence of certain (spontaneous) events. One example is the content about the life of Donald Trump, which in general may not be a topic of interests to most users but likely will be in light of the winning of the U.S. presidential election by Donald Trump. Such dynamic adjustment to the content pool aims at covering a dynamic (and likely growing) range of interests of users, including those that are, e.g., exhibited by users in different settings or applications or predicted in light of context information. Such newly discovered content may then be evaluated before it can be selected to be added to the content pool.

Certain content in the content pool, e.g., journals or news, need to be updated over time. Conventional solutions usually update such content periodically based on a fixed schedule. The pace of updating content in the content pool may be determined dynamically based on a variety of factors. Content update may be affected by context information. For example, the frequency at which a content item scheduled to be updated may be every 2 hours, but this frequency can be dynamically adjusted according to, e.g., an explosive event such as an earthquake. As another example, content from a social group on Facebook devoted to Catholicism may normally be updated daily. When Donald Trump's election win made the news, the content from that social group may be updated every 30 minutes so that interested users can keep track of discussions from members of this social group. In addition, whenever there are newly identified content sources, it can be scheduled to update the content pool by, e.g., crawling the content from the new sources, processing the crawled content, evaluating the crawled content, and selecting quality new content to be incorporated into the content pool. Such a dynamically-updated content pool aims at growing in accordance with the dynamically changing users' interests in order to facilitate quality personalized content recommendation.

However, despite efforts to diligently update a content pool to provide quality personalized content recommendation to the users, the number or amount of content items for each content topic available in the content pool may not match a demand for that content topic as evidenced by user profiles/interests. For example, based on typical user personalization techniques, it may be discovered that, for a set of users that consume content from a content pool, a majority of the users are interested in a content topic, but the content pool has, let's say, only 1% of all content items related to that content topic. As such, the content topic is considered to be misrepresented in the content pool in that it is under-represented in the content pool relative to the (high) demand for that content topic. In such of under-representation of a content topic, increasing the number of content items available in the content pool may have a positive effect on user engagement as the ability to match just a right piece of content item to an interested user may require a relatively large pool of content to learn from. So, for example, if we have 10,000 pieces of content related to a content topic X, we would expect to see much better user engagement than if we had only 10 pieces of content related to the content topic X. On the other hand, it may be possible that a minority (say, 5%) of the users are interested in another content topic, but the content pool has, let's say, 75% of all content items related to that content topic. In that case, the content topic is considered to be over-represented in the content pool relative to the (low) demand for that content topic.

Given such under- and over-representation of content topics, users may not be served well with enough relevant content to provide them with a satisfactory experience with the content provider. Further, given that content providers (e.g., website portals, etc.) typically may have a limited budget for the content they create or license, misrepresentation of content topics in the pool may mean that they are unnecessarily spending money on content topics that their users don't want and are not spending enough on topics in which the users have exhibited higher interest. To address such misrepresentation of content topics, the techniques discussed in the present disclosure may be implemented at any given time (e.g., periodically or on-demand) to assess the quality and quantity of the content in the content pool. The disclosed techniques include evaluating availability of content related to each content topic by assessing attributes of content items present in the content pool, evaluating a level of interest of a set of users in each content topic based at least on information related to interaction of the set of users with the content items. A level of representation of the content topic in the content pool may then be determined based at least on the determined availability of content and the determined level of interest. Based on the level of representation, at least some of the set of content items related to the content topic may be updated. For example, if the level of representation of the content topic is equal to or greater than a threshold (indicating under-representation of the content topic), content items related to the content topic may be added in the content pool, e.g., by creating, licensing or crawling for new content. Further, if the level of representation of the content topic is less than the threshold (indicating over-representation of the content topic), content items related to the content topic may be deleted from the content pool.

Additional novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

FIG. 1 depicts an exemplary system diagram 10 for personalized content recommendation to a user 105, according to an embodiment of the present teaching. System 10 comprises a personalized content recommendation module 100, which comprises numerous sub modules, content sources 110, knowledge archives 115, third party platforms 120, and advertisers 125 with advertisement taxonomy 127 and advertisement database 126. Content sources 110 may be any source of on-line content such as on-line news, published papers, blogs, on-line tabloids, magazines, audio content, image content, and video content. It may be content from a content provider such as Yahoo! Finance, Yahoo! Sports, CNN, and ESPN. It may be multi-media content or text or any other form of content comprised of website content, social media content, such as Facebook, twitter, Reddit, etc, or any other content rich provider. It may be licensed content from providers such AP and Reuters. It may also be content crawled and indexed from various sources on the Internet. Content sources 110 provide a vast array of content to the personalized content recommendation module 100 of system 10.

Knowledge archives 115 may be an on-line encyclopedia such as Wikipedia or indexing system such as an on-line dictionary. On-line concept archives 115 may be used for its content as well as its categorization or indexing systems. Knowledge archives 115 provide extensive classification system to assist with the classification of both the user's 105 preferences as well as classification of content. Knowledge concept archives, such as Wikipedia may have hundreds of thousands to millions of classifications and sub-classifications. A classification is used to show the hierarchy of the category. Classifications serve two main purposes. First they help the system understand how one category relates to another category and second, they help the system maneuver between higher levels on the hierarchy without having to move up and down the subcategories. The categories or classification structure found in knowledge archives 115 is used for multidimensional content vectors as well as multidimensional user profile vectors which are utilized by personalized content recommendation module 100 to match personalized content to a user 105. Third party platforms 120 maybe any third party applications including but not limited to social networking sites like Facebook, Twitter, LinkedIn, Google+. It may include third party mail servers such as Gmail or a search engine such as Bing Search. Third party platforms 120 provide both a source of content as well as insight into a user's personal preferences and behaviors.

Advertisers 125 are coupled with the ad content database 126 as well as an ads classification system or ad. taxonomy 127 intended for classified advertisement content. Advertisers 125 may provide streaming content, static content, and sponsored content. Advertising content may be placed at any location on a personalized content page and may be presented both as part of a content stream as well as a standalone advertisement, placed strategically around or within the content stream.

Personalized content recommendation module 100 comprises applications 130, content pool 135, content pool generation/update unit 140, concept/content analyzer 145, content crawler 150, unknown interest explorer 215, user understanding unit 155, user profiles 160, content taxonomy 165, context information analyzer 170, user event analyzer 175, third party interest analyzer 190, social media content source identifier 195, advertisement insertion unit 200 and content/advertisement/taxonomy correlator 205. These components are connected to achieve personalization, content pooling, and recommending personalized content to a user. For example, the content ranking unit 210 works in connection with context information analyzer 170, the unknown interest explorer 215, and the ad insertion unit 200 to generate personalized content to be recommended to a user with personalized ads or probing content inserted. To achieve personalization, the user understanding unit 155 works in connection with a variety of components to dynamically and continuously update the user profiles 160, including content taxonomy 165, the knowledge archives 115, user event analyzer 175, and the third party interest analyzer 190. Various components are connected to continuously maintain a content pool, including the content pool generation/update unit 140, user event analyzer 175, social media content source identifier 195, content/concept analyzer 145, content crawler 150, the content taxonomy 165, as well as user profiles 160.

Personalized content recommendation module 100 is triggered when user 105 engages with system 10 through applications 130. Applications 130 may receive information in the form of a user id, cookies, log-in information from user 105 via some form of computing device. User 105 may access system 10 via a wired or wireless device and may be stationary or mobile. User 105 may interface with the applications 130 on a tablet, a Smartphone, a laptop, a desktop or any other computing device which may be embedded in devices such as watches, eyeglasses, or vehicles. In addition to receiving insights from the user 105 about what information the user 105 might be interested, applications 130 provides information to user 105 in the form of personalized content stream. User insights might be user search terms entered to the system, declared interests, user clicks on a particular article or subject, user dwell time or scroll over of particular content, user skips with respect to some content, etc. User insights may be a user indication of a like, a share, or a forward action on a social networking site, such as Facebook, or even peripheral activities such as print or scan of certain content. All of these user insights or events may be utilized by the personalized content recommendation module 100 to locate and customize content to be presented to user 105. User insights received via applications 130 are used to update personalized profiles for users which may be stored in user profiles 160. User profiles 160 may be database or a series of databases used to store personalized user information on all the users of system 10. User profiles 160 may be a flat or relational database and may be stored in one or more locations. Such user insights may also be used to determine how to dynamically update the content in the content pool 135. Further, other information that may be received via applications 130 for personalized user profiles may include a browser's name and version, device type, screen resolution, operating system and version, geo location, and/or other information related to a device used by the user.

A specific user event received via applications 130 is passed along to user event analyzer 175, which analyzes the user event information and feeds the analysis result with event data to the user understanding unit 155 and/or the content pool generation/update unit 140. Based on such user event information, the user understanding unit 155 estimates short term interests of the user and/or infer user's long term interests based on behaviors exhibited by user 105 over long or repetitive periods. For example, a long term interest may be a general interest in sports, where as a short term interest may be related to a unique sports event, such as the Super Bowl at a particular time. Over time, a user's long term interest may be estimated by analyzing repeated user events. A user who, during every engagement with system 10, regularly selects content related to the stock market may be considered as having a long term interest in finances. In this case, system 10 accordingly, may determine that personalized content for user 105 should contain content related to finance. Contrastingly, short term interest may be determined based on user events which may occur frequently over a short period, but which is not something the user 105 is interested in the long term. For example, a short term interest may reflect the momentary interest of a user which may be triggered by something the user saw in the content but such an interest may not persist over time. Both short and long term interest are important in terms of identifying content that meets the desire of the user 105, but need to be managed separately because of the difference in their nature as well as how they influence the user.

In some embodiments, short term interests of a user may be analyzed to predict the user's long term interests. To retain a user, it is important to understand the user's persistent or long term interests. By identifying user 105's short term interest and providing him/her with a quality personalized experience, system 10 may convert an occasional user into a long term user. Additionally, short term interest may trend into long term interest and vice versa. The user understanding unit 155 provides the capability of estimating both short and long term interests.

The user understanding unit 155 gathers user information from multiple sources, including all the user's events, and creates one or more multidimensional personalization vectors. In some embodiments, the user understanding unit 155 receives inferred characteristics about the user 105 based on the user events, such as the content he/she views, self declared interests, attributes or characteristics, user activities, and/or events from third party platforms. In an embodiment, the user understanding unit 155 receives inputs from social media content source identifier 195. Social media content source identifier 195 relies on user 105's social media content to personalize the user's profile. By analyzing the user's social media pages, likes, shares, etc, social media content source identifier 195 provides information for user understanding unit 155. The social media content source identifier 195 is capable of recognizing new content sources by identifying, e.g., quality curators on social media platforms such as Twitter, Facebook, or blogs, and enables the personalized content recommendation module 100 to discover new content sources from where quality content can be added to the content pool 135. The information generated by social media content source identifier 195 may be sent to a content/concept analyzer 145 and then mapped to specific category or classification based on content taxonomy 165 as well as a knowledge archives 115 classification system.

The third party interest analyzer 190 leverages information from other third party platforms about users active on such third party platforms, their interests, as well as content these third party users to enhance the performance of the user understanding unit 155. For example, when information about a large user population can be accessed from one or more third party platforms, the user understanding unit 155 can rely on data about a large population to establish a baseline interest profile to make the estimation of the interests of individual users more precise and reliable, e.g., by comparing interest data with respect to a particular user with the baseline interest profile which will capture the user's interests with a high level of certainty.

When new content is identified from content source 110 or third party platforms 120, it is processed and its concepts are analyzed. The concepts can be mapped to one or more categories in the content taxonomy 165 and the knowledge archives 115. The content taxonomy 165 is an organized structure of concepts or categories of concepts including numerous different classifications. The knowledge archives 115 may provide millions of concepts, which may or may not be structures in a similar manner as the content taxonomy 165. Such content taxonomy and knowledge archives may serve as a universal interest space. Concepts estimated from the content can be mapped to a universal interest space and a high dimensional vector can be constructed for each content item and used to characterize the content. Similarly, for each user, a personal interest profile may also be constructed, mapping the user's interests, characterized as concepts, to the universal interest space so that a high dimensional vector can be constructed with the user's interests levels populated in the vector.

Content pool 135 may be a general content pool with content to be used to serve all users. The content pool 135 may also be structured so that it may have personalized content pool for each user. In this case, content in the content pool is generated and retained with respect to each individual user. The content pool may also be organized as a tiered system with both the general content pool and personalized individual content pools for different users. For example, in each content pool for a user, the content itself may not be physically present but is operational via links, pointers, or indices which provide references to where the actual content is stored in the general content pool.

Content pool 135 is dynamically updated by content pool generation/update module 140. Content in the content pool comes and go and decisions are made based on the dynamic information of the users, the content itself, as well as other types of information. For example, when the performance of content deteriorates, e.g., low level of interests exhibited from users, the content pool generation/update unit 140 may decide to purge it from the content pool. When content becomes stale or outdated, it may also be removed from the content pool. When there is a newly detected interest from a user, the content pool generation/update unit 140 may fetch new content aligning with the newly discovered interests. User events may be an important source of making observations as to content performance and user interest dynamics. User activities are analyzed by the user event analyzer 175 and such Information is sent to the content pool generation/update unit 140. When fetching new content, the content pool generation/update unit 140 invokes the content crawler 150 to gather new content, which is then analyzed by the content/concept analyzer 145, then evaluated by the content pool generation/update unit 140 as to its quality and performance before it is decided whether it will be included in the content pool or not. Content may be removed from content pool 135 because it is no longer relevant, because other users are not considering it to be of high quality or because it is no longer timely. As content is constantly changing and updating content pool 135 is constantly changing and updating providing user 105 with a potential source for high quality, timely personalized content.

In addition to content, personalized content recommendation module 100 provides for targeted or personalized advertisement content from advertisers 125. Advertisement database 126 houses advertising content to be inserted into a user's content stream. Advertising content from ad database 126 is inserted into the content stream via Content ranking unit 210. The personalized selection of advertising content can be based on the user's profile. Content/advertisement/user taxonomy correlator 205 may re-project or map a separate advertisement taxonomy 127 to the taxonomy associated with the user profiles 160. Content/advertisement/user taxonomy correlator 205 may apply a straight mapping or may apply some intelligent algorithm to the re-projection to determine which of the users may have a similar or related interest based on similar or overlapping taxonomy categories.

Content ranking unit 210 generates the content stream to be recommended to user 105 based on content, selected from content pool 135 based on the user's profile, as well as advertisement, selected by the advertisement insertion unit 200. The content to be recommended to the user 105 may also be determined, by the content ranking unit 210, based on information from the context information analyzer 170. For example, if a user is currently located in a beach town which differs from the zip code in the user's profile, it can be inferred that the user may be on vacation. In this case, information related to the locale where the user is currently in may be forwarded from the context information analyzer to the Content ranking unit 210 so that it can select content that not only fit the user's interests but also is customized to the locale. Other context information include day, time, and device type. The context information can also include an event detected on the device that the user is currently using such as a browsing event of a website devoted to fishing. Based on such a detected event, the momentary interest of the user may be estimated by the context information analyzer 170, which may then direct the Content ranking unit 210 to gather content related to fishing amenities in the locale the user is in for recommendation.

The personalized content recommendation module 100 can also be configured to allow probing content to be included in the content to be recommended to the user 105, even though the probing content does not represent subject matter that matches the current known interests of the user. Such probing content is selected by the unknown interest explorer 215. Once the probing content is incorporated in the content to be recommended to the user, information related to user activities directed to the probing content (including no action) is collected and analyzed by the user event analyzer 175, which subsequently forwards the analysis result to long/short term interest identifiers 180 and 185. If an analysis of user activities directed to the probing content reveals that the user is or is not interested in the probing content, the user understanding unit 155 may then update the user profile associated with the probed user accordingly. This is how unknown interests may be discovered. In some embodiments, the probing content is generated based on the current focus of user interest (e.g., short term) by extrapolating the current focus of interests. In some embodiments, the probing content can be identified via a random selection from the general content, either from the content pool 135 or from the content sources 110, so that an additional probing can be performed to discover unknown interests.

To identify personalized content for recommendation to a user, the content ranking unit 210 takes all these inputs and identify content based on a comparison between the user profile vector and the content vector in a multiphase ranking approach. The selection may also be filtered using context information. Advertisement to be inserted as well as possibly probing content can then be merged with the selected personalized content.

Figure 2:
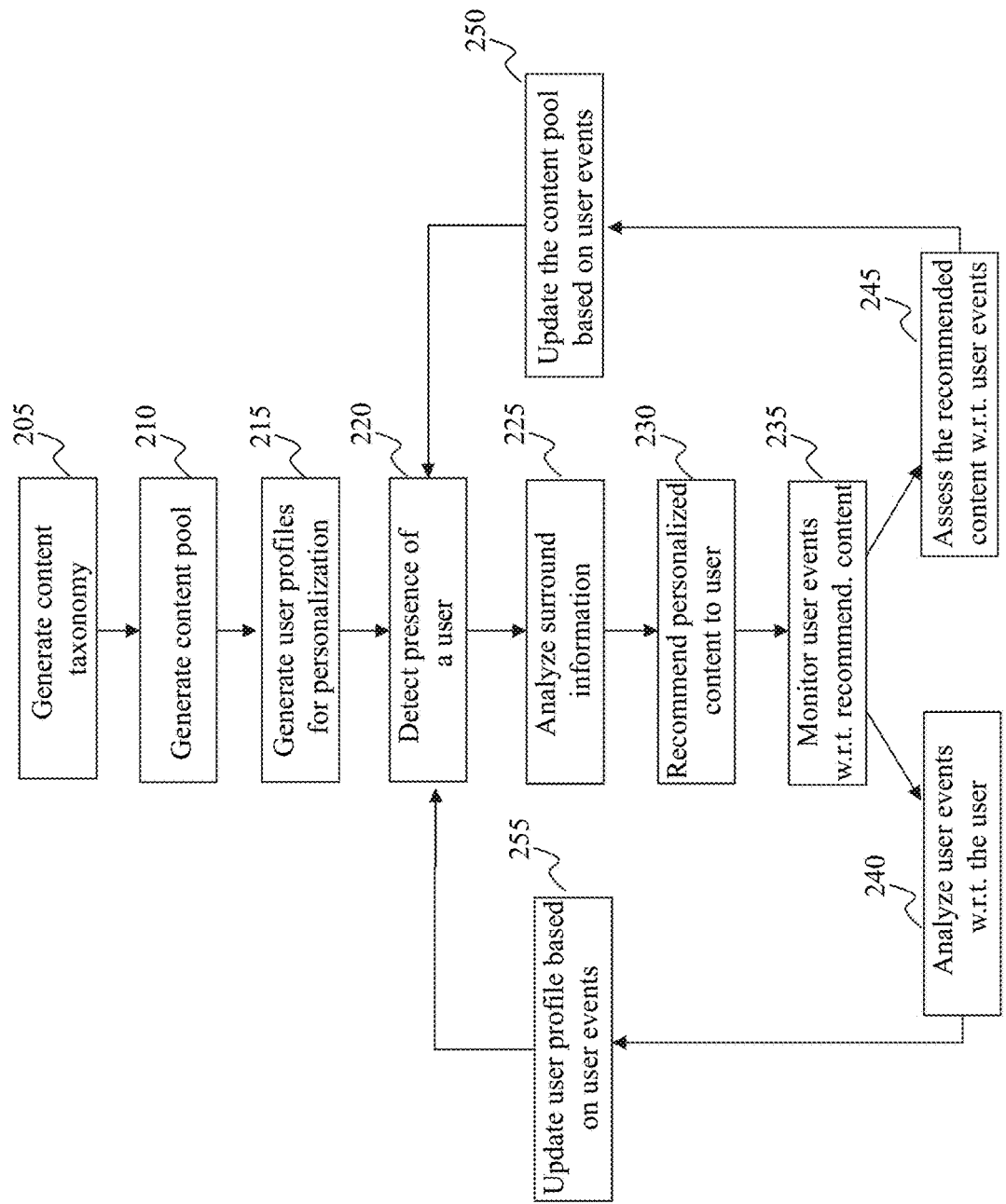
FIG. 2 is a flowchart of an exemplary process for personalized content recommendation, according to an embodiment of the present teaching.
Figure 5:
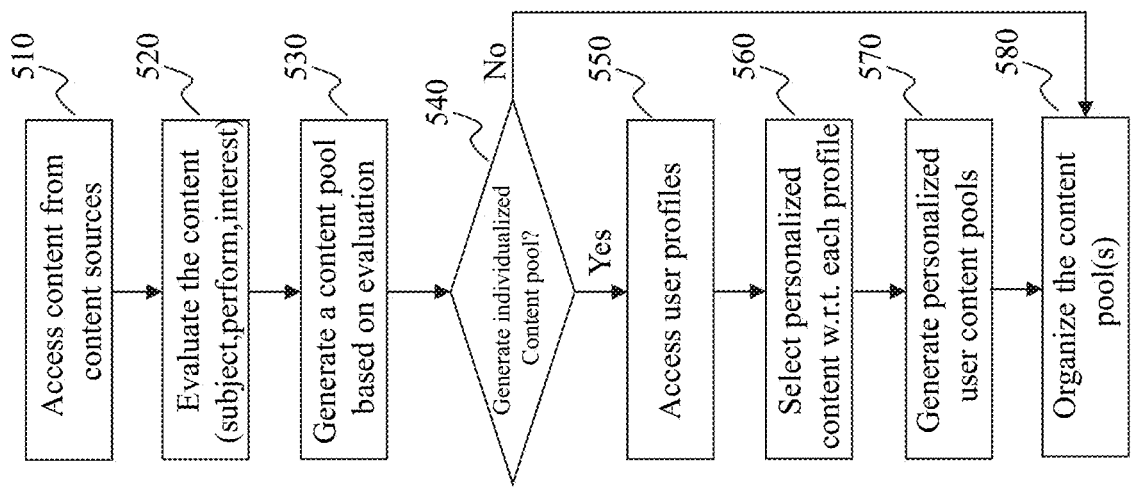
FIG. 5 is a flowchart of an exemplary process of creating a content pool, according to an embodiment of the present teaching.

FIG. 2 is a flowchart of an exemplary process for personalized content recommendation, according to an embodiment of the present teaching. Content taxonomy is generated at 205. Content is accessed from different content sources and analyzed and classified into different categories, which can be pre-defined. Each category is given some labels and then different categories are organized into some structure, e.g., a hierarchical structure. A content pool is generated at 210. Different criteria may be applied when the content pool is created. Examples of such criteria include topics covered by the content in the content pool, the performance of the content in the content pool, etc. Sources from which content can be obtained to populate the content pool include content sources 110 or third party platforms 120 such as Facebook, Twitter, blogs, etc. FIG. 5 provides a more detailed exemplary flowchart related to content pool creation, according to an embodiment of the present teaching. User profiles are generated at 215 based on, e.g., user information, user activities, identified short/long term interests of the user, etc. The user profiles may be generated with respect to a baseline population interest profile, established based on, e.g., information about third party interest, knowledge archives, and content taxonomies.

Figure 3:
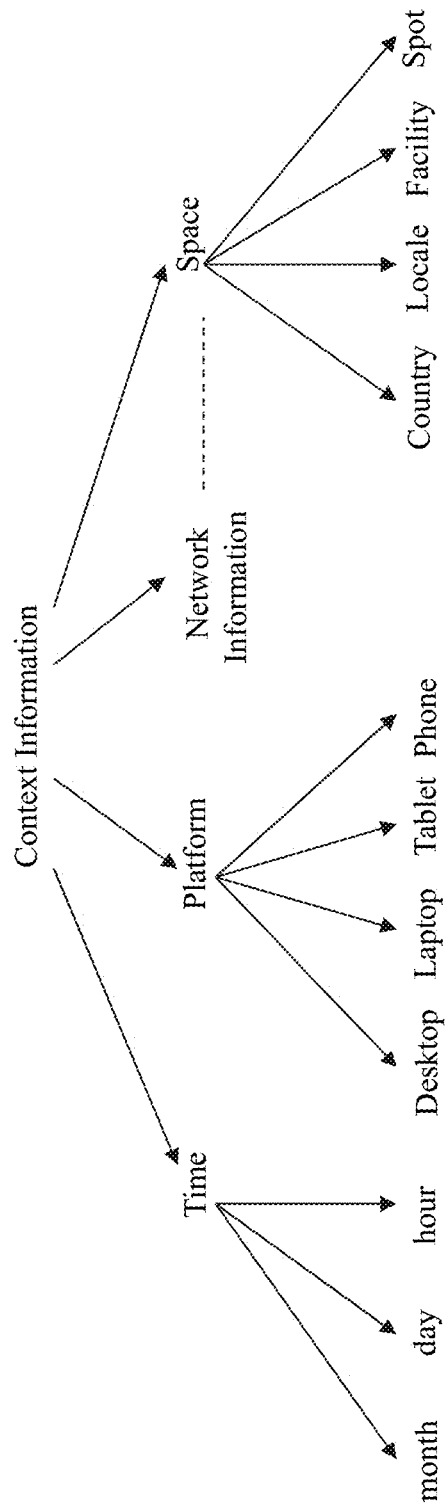
FIG. 3 illustrates exemplary types of context information.

Once the user profiles and the content pool are created, when the system 10 detects the presence of a user, at 220, the context information, such as locale, day, time, may be obtained and analyzed, at 225. FIG. 3 illustrates exemplary types of context information. Based on the detected user's profile, optionally context information, personalized content is identified for recommendation. A high level exemplary flow for generating personalized content for recommendation is presented in FIG. 5. Such gathered personalized content may be ranked and filtered to achieve a reasonable size as to the amount of content for recommendation. Optionally (not shown), advertisement as well as probing content may also be incorporated in the personalized content. Such content is then recommended to the user at 230.

User reactions or activities with respect to the recommended content are monitored, at 235, and analyzed at 240. Such events or activities may include clicks, skips, dwell time measured, scroll location and speed, position, time, sharing, forwarding, hovering, motions such as shaking, etc. It is understood that any other events or activities may be monitored and analyzed. For example, when the user moves the mouse cursor over the content, the title or summary of the content may be highlighted or slightly expanded. In another example, when a user interacts with a touch screen by her/his finger[s], any known touch screen user gestures may be detected. In still another example, eye tracking on the user device may be another user activity that is pertinent to user behaviors and can be detected. The analysis of such user events includes assessment of long term interests of the user and how such exhibited short term interests may influence the system's understanding of the user's long term interests. Information related to such assessment is then forwarded to the user understanding unit 155 to guide how to update, at 255, the user's profile. At the same time, based on the user's activities, the portion of the recommended content that the user showed interests are assessed, at 245, and the result of the assessment is then used to update, at 250, the content pool. For example, if the user shows interests on the probing content recommended, it may be appropriate to update the content pool to ensure that content related to the newly discovered interest of the user will be included in the content pool.

FIG. 3 illustrates different types of context information that may be detected and utilized in assisting to personalize content to be recommended to a user. In this illustration, context information may include several categories of data, including, but not limited to, time, space, platform, and network conditions. Time related information can be time of the year (e.g., a particular month from which season can be inferred), day of a week, specific time of the day, etc. Such information may provide insights as to what particular set of interests associated with a user may be more relevant. To infer the particular interests of a user at a specific moment may also depend on the locale that the user is in and this can be reflected in the space related context information, such as which country, what locale (e.g., tourist town), which facility the user is in (e.g., at a grocery store), or even the spot the user is standing at the moment (e.g., the user may be standing in an aisle of a grocery store where cereal is on display). Other types of context information includes the specific platform related to the user's device, e.g., Smartphone, Tablet, laptop, desktop, bandwidth/data rate allowed on the user's device, which will impact what types of content may be effectively presented to the user. In addition, the network related information such as state of the network where the user's device is connected to, the available bandwidth under that condition, etc. may also impact what content should be recommended to the user so that the user can receive or view the recommended content with reasonable quality.

Figure 4:
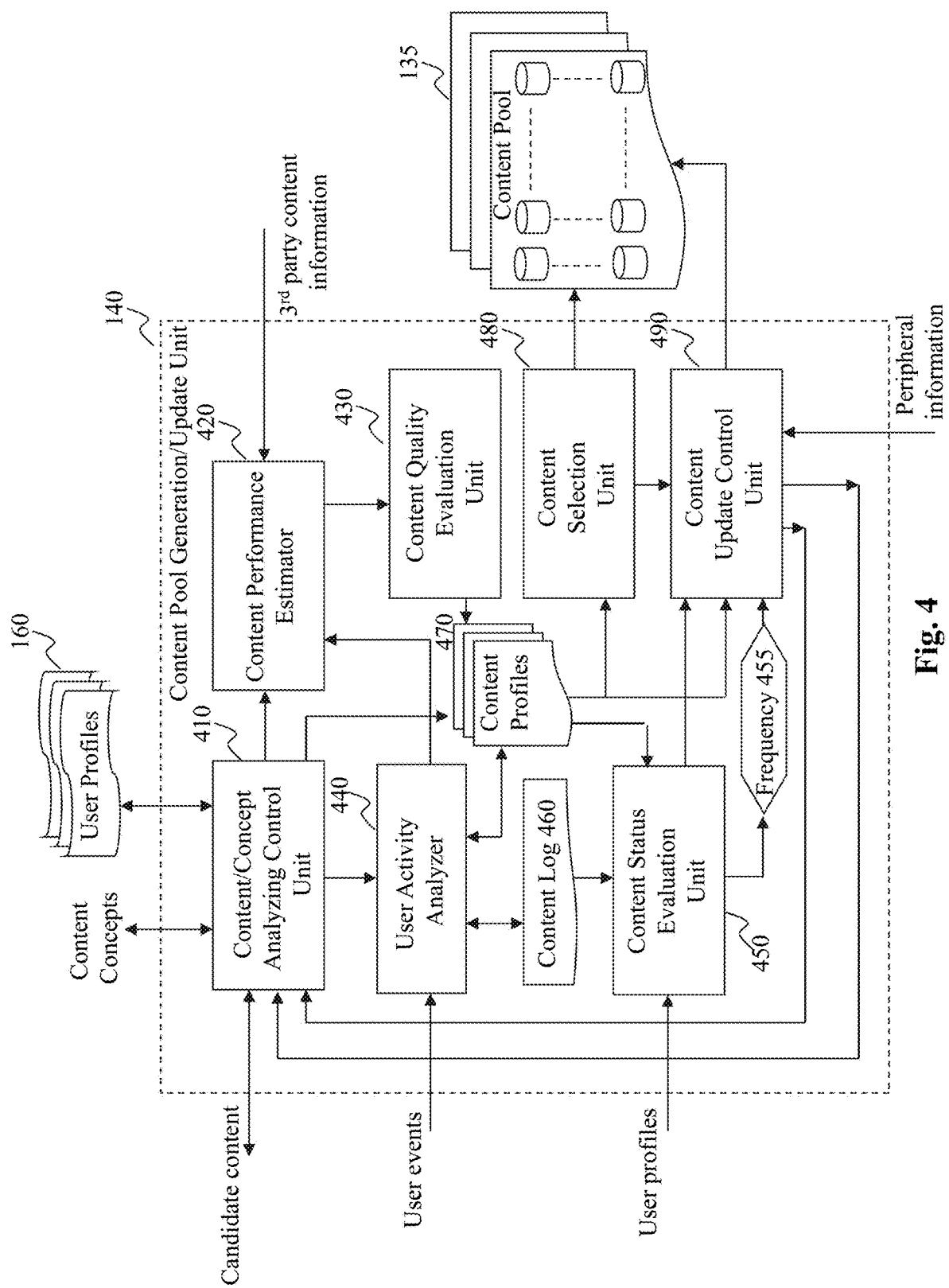
FIG. 4 depicts an exemplary diagram of a content pool generation/update unit, according to an embodiment of the present teaching.

FIG. 4 depicts an exemplary system diagram of the content pool generation/update unit 140, according to an embodiment of the present teaching. The content pool 135 can be initially generated and then maintained according to the dynamics of the users, contents, and needs detected. In this illustration, the content pool generation/update unit 140 comprises a content/concept analyzing control unit 410, a content performance estimator 420, a content quality evaluation unit 430, a content selection unit 480, which will select appropriate content to place into the content pool 135. In addition, to control how content is to be updated, the content pool generation/update unit 140 also includes a user activity analyzer 440, a content status evaluation unit 450, and a content update control unit 490.

The content/concept analyzing control unit 410 interfaces with the content crawler 150 (FIG. 1) to obtain candidate content that is to be analyzed to determine whether the new content is to be added to the content pool. The content/concept analyzing control unit 410 also interfaces with the content/concept analyzer 145 (see FIG. 1) to get the content analyzed to extract concepts or subjects covered by the content. Based on the analysis of the new content, a high dimensional vector for the content profile can be computed via, e.g., by mapping the concepts extracted from the content to the universal interest space, e.g., defined via Wikipedia or other content taxonomies. Such a content profile vector can be compared with user profiles 160 to determine whether the content is of interest to users. In addition, content is also evaluated in terms of its performance by the content performance estimator 420 based on, e.g., third party information such as activities of users from third party platforms so that the new content, although not yet acted upon by users of the system, can be assessed as to its performance. The content performance information may be stored, together with the content's high dimensional vector related to the subject of the content, in the content profile 470. The performance assessment is also sent to the content quality evaluation unit 430, which, e.g., will rank the content in a manner consistent with other pieces of content in the content pool. Based on such rankings, the content selection unit 480 then determines whether the new content is to be incorporated into the content pool 135.

To dynamically update the content pool 135, the content pool generation/update unit 140 may keep a content log 460 with respect to all content presently in the content pool and dynamically update the log when more information related to the performance of the content is received. When the user activity analyzer 440 receives information related to user events, it may log such events in the content log 460 and perform analysis to estimate, e.g., any change to the performance or popularity of the relevant content over time. The result from the user activity analyzer 440 may also be utilized to update the content profiles, e.g., when there is a change in performance. The content status evaluation unit 450 monitors the content log and the content profile 470 to dynamically determine how each content item in the content pool 135 is to be updated. Depending on the status with respect to a content item, the content status evaluation unit 450 may decide to purge the content if its performance degrades below a certain level. It may also decide to purge a content item when the overall interest level of users of the system drops below a certain level. For content that requires update, e.g., news or journals, the content status evaluation unit 450 may also control the frequency 455 of the updates based on the dynamic information it receives. The content update control unit 490 carries out the update jobs based on decisions from the content status evaluation unit 450 and the frequency at which certain content needs to be updated. The content update control unit 490 may also determine to add new content whenever there is peripheral information indicating the needs, e.g., there is an explosive event and the content in the content pool on that subject matter is not adequate. In this case, the content update control unit 490 analyzes the peripheral information and if new content is needed, it then sends a control signal to the content/concept analyzing control unit 410 so that it can interface with the content crawler 150 to obtain new content.

FIG. 5 is a flowchart of an exemplary process of creating the content pool, according to an embodiment of the present teaching. Content is accessed at 510 from content sources, which include content from content portals such as Yahoo!, general Internet sources such as web sites or FTP sites, social media platforms such as Twitter, or other third party platforms such as Facebook. Such accessed content is evaluated, at 520, as to various considerations such as performance, subject matters covered by the content, and how it fit users' interests. Based on such evaluation, certain content is selected to generate, at 530, the content pool 135, which can be for the general population of the system or can also be further structured to create sub content pools, each of which may be designated to a particular user according to the user's particular interests. At 540, it is determined whether user-specific content pools are to be created. If not, the general content pool 135 is organized (e.g., indexed or categorized) at 580. If individual content pools for individual users are to be created, user profiles are obtained at 550, and with respect to each user profile, a set of personalized content is selected at 560 that is then used to create a sub content pool for each such user at 570. The overall content pool and the sub content pools are then organized at 580.

Figure 6:
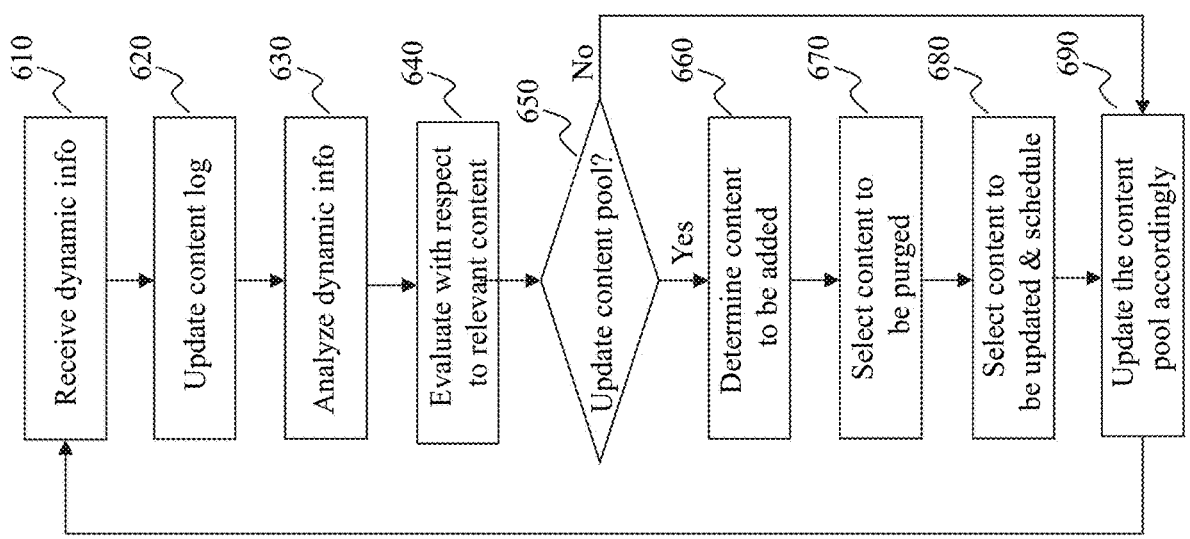
FIG. 6 is a flowchart of an exemplary process for updating a content pool, according to an embodiment of the present teaching.

FIG. 6 is a flowchart of an exemplary process for updating the content pool 135, according to an embodiment of the present teaching. Dynamic information is received at 610 and such information includes user activities, peripheral information, user related information, etc. Based on the received dynamic information, the content log is updated at 620 and the dynamic information is analyzed at 630. Based on the analysis of the received dynamic information, it is evaluated, at 640, with respect to the content implicated by the dynamic information, as to the change of status of the content. For example, if received information is related to user activities directed to specific content pieces, the performance of the content piece may need to be updated to generate a new status of the content piece. It is then determined, at 650, whether an update is needed. For instance, if the dynamic information from a peripheral source indicates that content of certain topic may have a high demand in the near future, it may be determined that new content on that topic may be fetched and added to the content pool. In this case, at 660, content that needs to be added is determined. In addition, if the performance or popularity of a content piece has just dropped below an acceptable level, the content piece may need to be purged from the content pool 135. Content to be purged is selected at 670. Furthermore, when update is needed for regularly refreshed content such as journal or news, the schedule according to which update is made may also be changed if the dynamic information received indicates so. This is achieved at 680.

Figure 7:
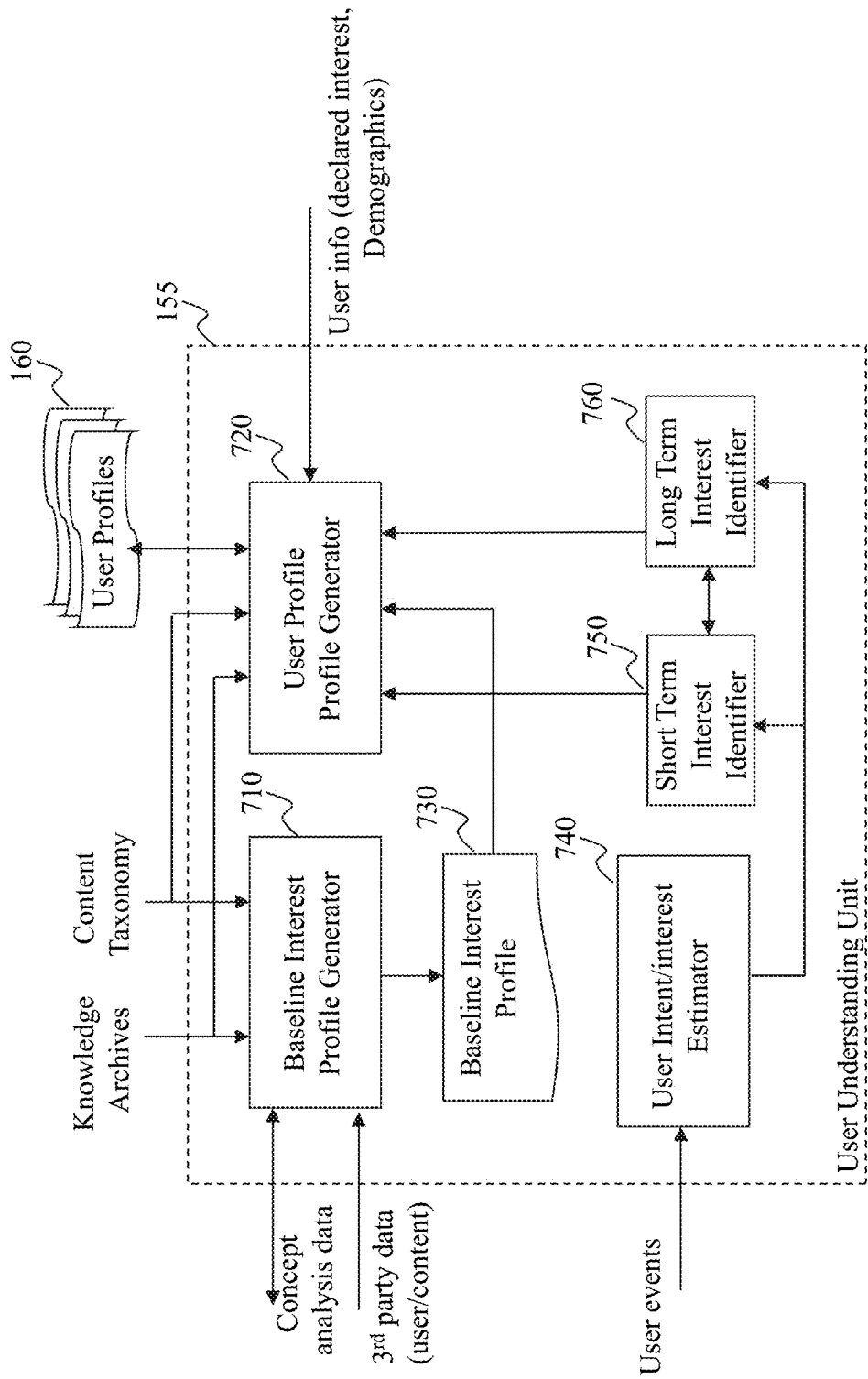
FIG. 7 depicts an exemplary diagram of a user understanding unit, according to an embodiment of the present teaching.

FIG. 7 depicts an exemplary diagram of the user understanding unit 155, according to an embodiment of the present teaching. In this exemplary construct, the user understanding unit 155 comprises a baseline interest profile generator 710, a user profile generator 720, a user intent/interest estimator 740, a short term interest identifier 750 and a long term interest identifier 760. In operation, the user understanding unit 155 takes various input and generates user profiles 160 as output. Its input includes third party data such as users' information from such third party platforms as well as content such users accessed and expressed interests, concepts covered in such third party data, concepts from the universal interest space (e.g., Wikipedia or content taxonomy), information about users for whom the personalized profiles are to be constructed, as well as information related to the activities of such users. Information from a user for whom a personalized profile is to be generated and updated includes demographics of the user, declared interests of the user, etc. Information related to user events includes the time, day, location at which a user conducted certain activities such as clicking on a content piece, long dwell time on a content piece, forwarding a content piece to a friend, etc.

In operation, the baseline interest profile generator 710 access information about a large user population including users' interests and content they are interested in from one or more third party sources (e.g., Facebook). Content from such sources is analyzed by the content/concept analyzer 145 (FIG. 1), which identifies the concepts from such content. When such concepts are received by the baseline interest profile generator 710, it maps such concepts to the knowledge archives 115 and content taxonomy 165 (FIG. 1) and generate one or more high dimensional vectors which represent the baseline interest profile of the user population. Such generated baseline interest profile is stored at 730 in the user understanding unit 155. When there is similar data from additional third party sources, the baseline interest profile 730 may be dynamically updated to reflect the baseline interest level of the growing population.

Once the baseline interest profile is established, when the user profile generator receives user information or information related to estimated short term and long term interests of the same user, it may then map the user's interests to the concepts defined by, e.g., the knowledge archives or content taxonomy, so that the user's interests are now mapped to the same space as the space in which the baseline interest profile is constructed. The user profile generator 720 then compares the user's interest level with respect to each concept with that of a larger user population represented by the baseline interest profile 730 to determine the level of interest of the user with respect to each concept in the universal interest space. This yields a high dimensional vector for each user. In combination with other additional information, such as user demographics, etc., a user profile can be generated and stored in 160.

User profiles 160 are updated continuously based on newly received dynamic information. For example, a user may declare additional interests and such information, when received by the user profile generator 720, may be used to update the corresponding user profile. In addition, the user may be active in different applications and such activities may be observed and information related to them may be gathered to determine how they impact the existing user profile and when needed, the user profile can be updated based on such new information. For instance, events related to each user may be collected and received by the user intent/interest estimator 740. Such events include that the user dwelled on some content of certain topic frequently, that the user recently went to a beach town for surfing competition, or that the user recently participated in discussions on gun control, etc. Such information can be analyzed to infer the user intent/interests. When the user activities relate to reaction to content when the user is online, such information may be used by the short term interest identifier 750 to determine the user's short term interests. Similarly, some information may be relevant to the user's long term interests. For example, the number of requests from the user to search for content related to diet information may provide the basis to infer that the user is interested in content related to diet. In some situations, estimating long term interest may be done by observing the frequency and regularity at which the user accesses certain type of information. For instance, if the user repeatedly and regularly accesses content related to certain topic, e.g., stocks, such repetitive and regular activities of the user may be used to infer his/her long term interests. The short term interest identifier 750 may work in connection with the long term interest identifier 760 to use observed short term interests to infer long term interests. Such estimated short/long term interests are also sent to the user profile generator 720 so that the personalization can be adapted to the changing dynamics.

Figure 8:
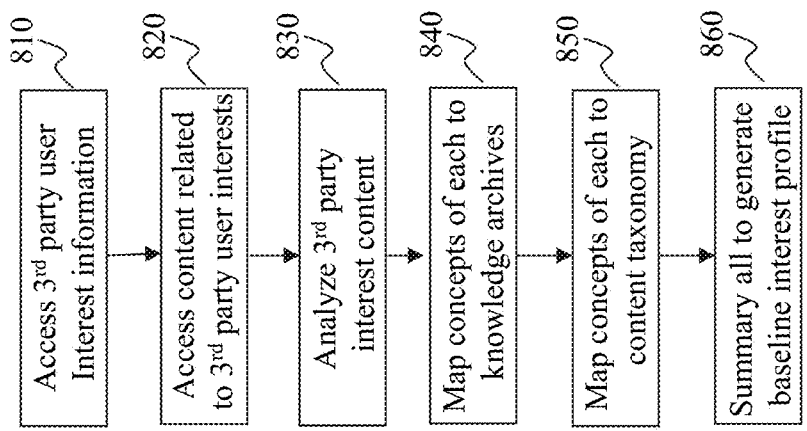
FIG. 8 is a flowchart of an exemplary process for generating a baseline interest profile, according to an embodiment of the present teaching.

FIG. 8 is a flowchart of an exemplary process for generating a baseline interest profile based on information related to a large user population, according to an embodiment of the present teaching. The third party information, including both user interest information as well as their interested content, is accessed at 810 and 820. The content related to the third party user interests is analyzed at 830 and the concepts from such content are mapped, at 840 and 850, to knowledge archives and/or content taxonomy. To build a baseline interest profile, the mapped vectors for third party users are then summarized to generate a baseline interest profile for the population. There can be a variety ways to summarize the vectors to generate an averaged interest profile with respect to the underlying population.

Figure 9:
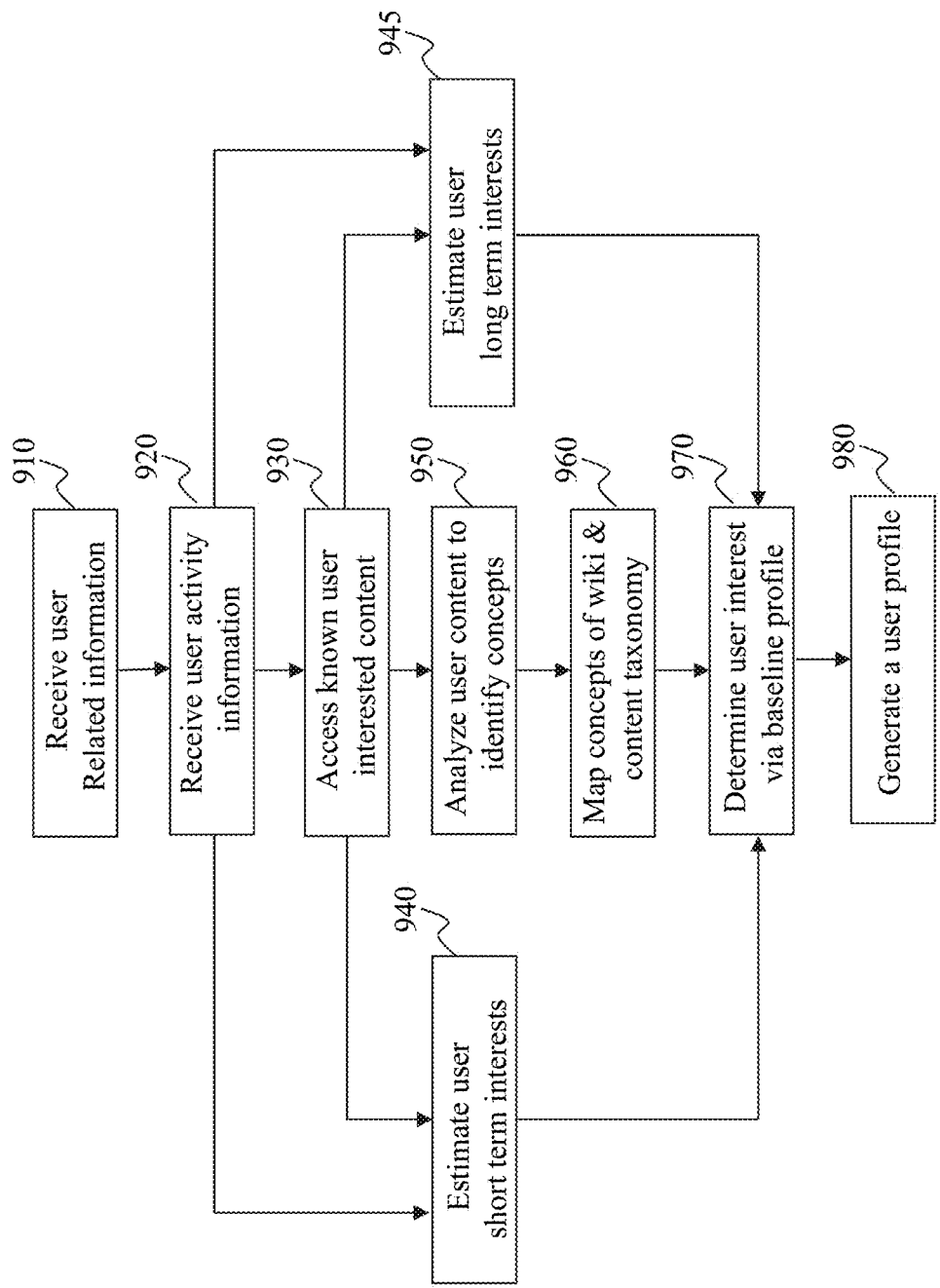
FIG. 9 is a flowchart of an exemplary process for generating a personalized user profile, according to an embodiment of the present teaching.

FIG. 9 is a flowchart of an exemplary process for generating/updating a user profile, according to an embodiment of the present teaching. User information is received first at 910. Such user information includes user demographics, user declared interests, etc. Information related to user activities is also received at 920. Content pieces or items that are known to be of interest to the user are accessed at 930, which are then analyzed, at 950, to extract concepts covered by the content pieces. The extracted concepts are then mapped, at 960, to the universal interest space and compared with, concept by concept, the baseline interest profile to determine, at 970, the specific level of interest of the user given the population. In addition, the level of interests of each user may also be identified based on known or estimated short and long term interests that are estimated, at 940 and 945, respectively, based on user activities or content known to be interested by the user. A personalized user profile can then be generated, at 980, based on the interest level with respect to each concept in the universal interest space.

Figure 10:
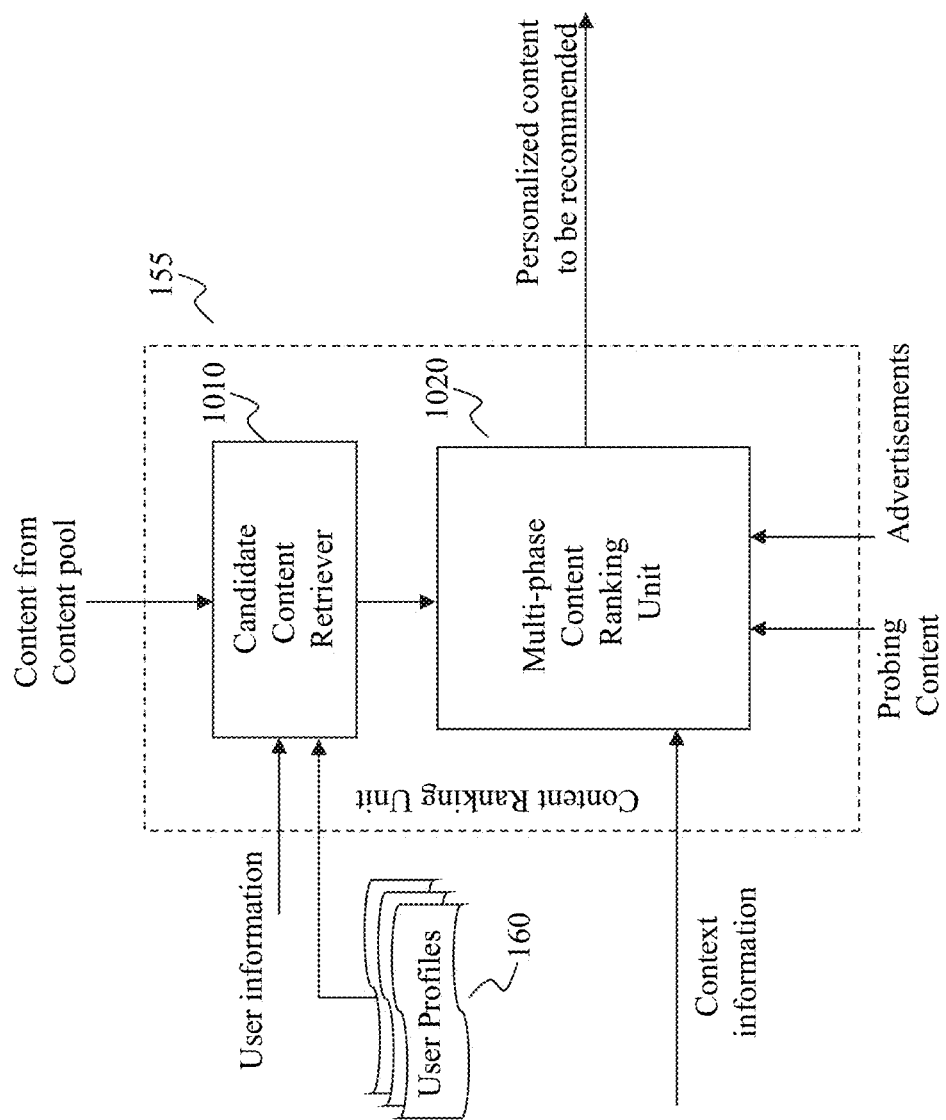
FIG. 10 depicts an exemplary system diagram for a content ranking unit, according to an embodiment of the present teaching.

FIG. 10 depicts an exemplary system diagram for the content ranking unit 210, according to an embodiment of the present teaching. The content ranking unit 210 takes variety of input and generates personalized content to be recommended to a user. The input to the content ranking unit 210 includes user information from the applications 130 with which a user is interfacing, user profiles 160, context information surrounding the user at the time, content from the content pool 135, advertisement selected by the ad insertion unit 200, and optionally probing content from the unknown interest explorer 215. The content ranking unit 210 comprises a candidate content retriever 1010 and a multi-phase content ranking unit 1020. Based on user information from applications 130 and the relevant user profile, the candidate content retriever 1010 determines the content pieces to be retrieved from the content pool 135. Such candidate content may be determined in a manner that is consistent with the user's interests or individualized. In general, there may be a large set of candidate content and it needs to be further determined which content pieces in this set are most appropriate given the context information. The multi-phase content ranking unit 1020 takes the candidate content from the candidate content retriever 1010, the advertisement, and optionally may be the probing content, as a pool of content for recommendation and then performs multiple stages of ranking, e.g., relevance based ranking, performance based ranking, etc. as well as factors related to the context surrounding this recommendation process, and selects a subset of the content to be presented as the personalized content to be recommended to the user.

Figure 11:
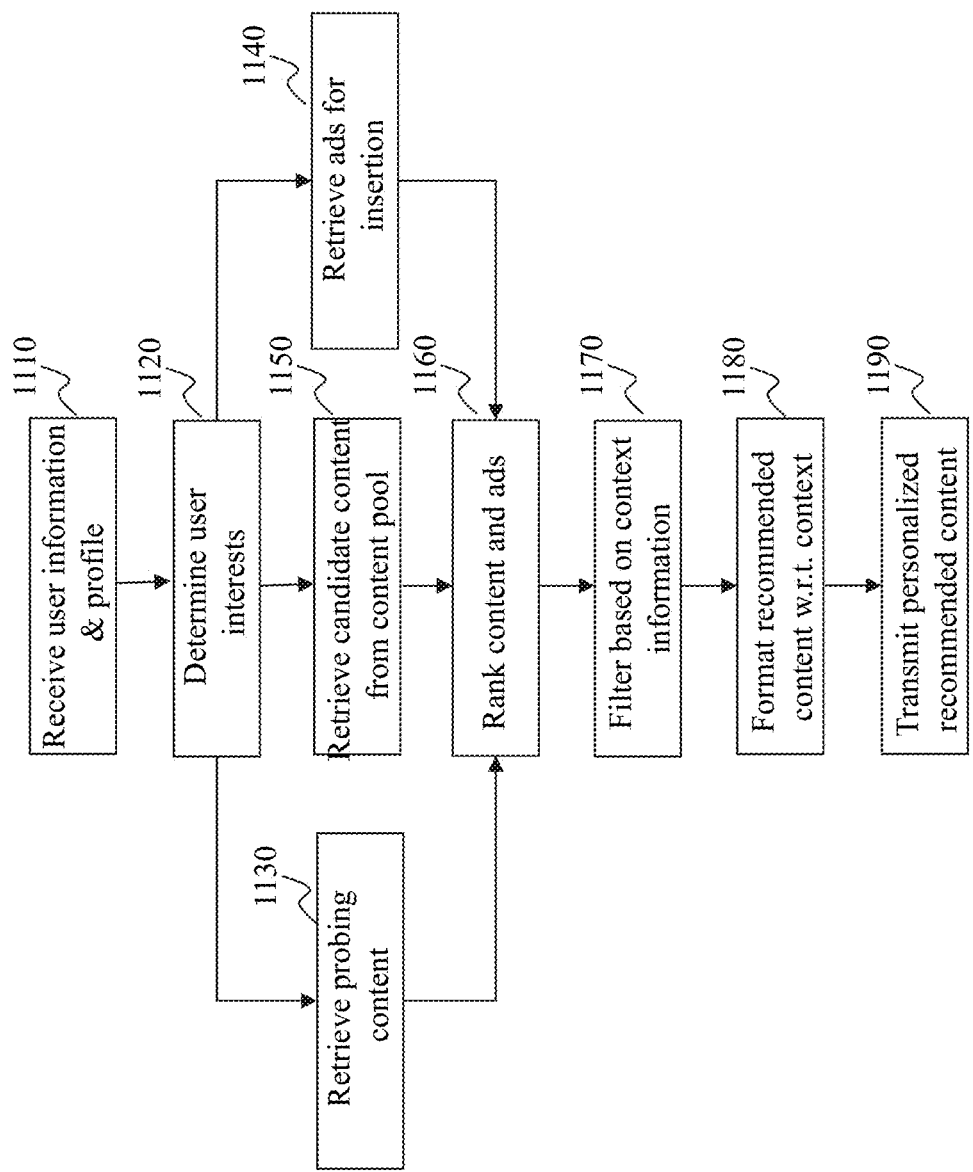
FIG. 11 is a flowchart of an exemplary process for the content ranking unit, according to an embodiment of the present teaching.

FIG. 11 is a flowchart of an exemplary process for the content ranking unit, according to an embodiment of the present teaching. User related information and user profile are received first at 1110. Based on the received information, user's interests are determined at 1120, which can then be used to retrieve, at 1150, candidate content from the content pool 135. The user's interests may also be utilized in retrieving advertisement and/or probing content at 1140 and 1130, respectively. Such retrieved content is to be further ranked, at 1160, in order to select a subset as the most appropriate for the user. As discussed above, the selection takes place in a multi-phase ranking process, each of the phases is directed to some or a combination of ranking criteria to yield a subset of content that is not only relevant to the user as to interests but also high quality content that likely will be interested by the user. The selected subset of content may also be further filtered, at 1170, based on, e.g., context information. For example, even though a user is in general interested in content about politics and art, if the user is currently in Milan, Italy, it is likely that the user is on vacation. In this context, rather than choosing content related to politics, the content related to art museums in Milan may be more relevant. The multi-phase content ranking unit 1020 in this case may filter out the content related to politics based on this contextual information. This yields a final set of personalized content for the user. At 1180, based on the contextual information associated with the surrounding of the user (e.g., device used, network bandwidth, etc.), the content ranking unit packages the selected personalized content, at 1180, in accordance with the context information and then transmits, at 1190, the personalized content to the user.

Figure 12:
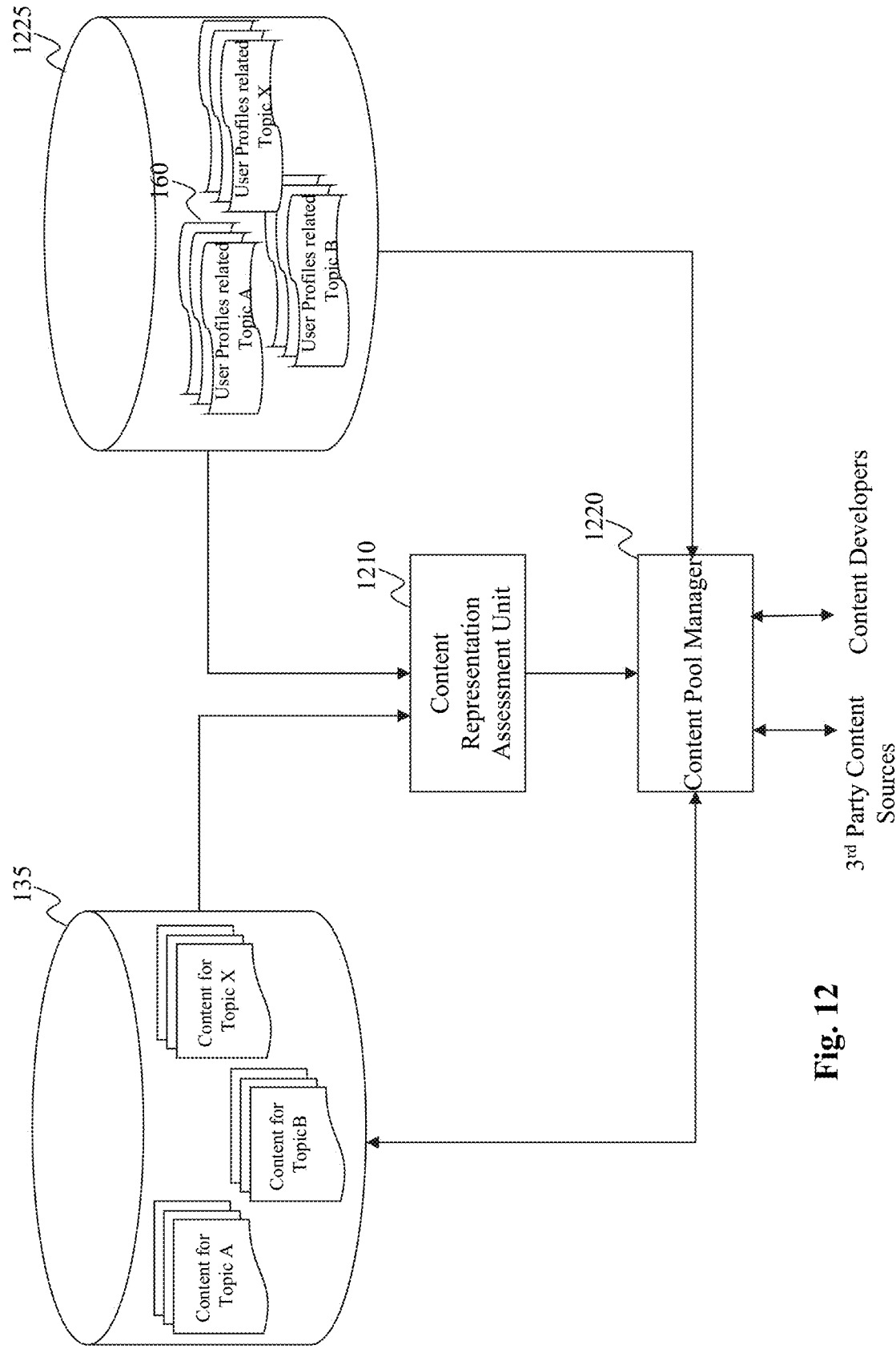
FIG. 12 depicts a broad exemplary diagram of a system in which techniques to manage representation of a content topic in a content pool are implemented, according to an embodiment of the present teaching.

FIG. 12 depicts a broad exemplary diagram of a system 1200 in which techniques to manage representation of a content topic in a content pool are implemented, according to various embodiments of the present teaching. As shown, the system 1200 includes a content representation assessment unit 1210 and a content pool manager 1220 that are in operative communication with a content pool, e.g., the content pool 135, and a repository/database 1225 storing the user profiles 160. Although not shown as such, the system 1200 including the content representation assessment unit 1210, the content pool manager 1220 and the database 1225 may be implemented as a part of the system 10. As discussed above, content items in the content pool 135 may be characterized in terms of "topics" or "concepts" it discloses and such a characterization may be generated with respect to the universal interest space, e.g., defined via concept archive(s) such as content taxonomy and/or Wikipedia and/or online encyclopedia. For example, each content item can be characterized via a high dimensional vector with each attribute of the vector corresponding to a topic in the interest universe and the value of the attribute indicates whether and/or to what degree the content covers the topic. The content pool 135 may have many different segments, where each segment is associated with one particular content topic and the segment includes content items that are determined to be classified under that content topic, e.g., based on the attribute of the interest vector. The database 1225 storing the user profiles 160 may be configured to group and store the user profiles 160 according different content topics of interest recorded in the user profiles 160. As discussed above with respect to the user understanding unit 155 and other related components of the system 10, the user profiles 160 are created and updated based on user demographics, user declared interests and/or information related to interaction of the users with the content items in the content pool.

The content representation assessment unit 1210 may be configured to assess the level of representation of the content topics in the content pool 135, i.e., determine whether and which content topics are under-represented and over-represented. To do so, the content representation assessment unit 1210 may receive or retrieve information from the content pool 135 related to the pool's content items as well as the user profiles 160 from the database 1225. The content representation assessment unit 1210 may, for each content topic, determine a level or measure of availability of content related to the content topic, and determine a level of interest of the users in the content topic based at least on information in the user profiles, e.g., information about interaction/engagement of the users with the content items. The content representation assessment unit 1210 may then determine a level of representation of the content topic in the content pool 135 based at least on the determined availability of content and the determined level of user interest.

For each content topic assessed by the content representation assessment unit 1210, the content pool manager 1220 may update at least some of the content items in the content pool 135 related to the content topic. For example, for a content topic that is determined to be under-represented in the content pool 135, the content pool manager 1220 may automatically advise content developers to develop new content for the under-represented content topic. The content pool manager 1220 may also automatically communicate or interface with one or more of content providers, content aggregators, social networks and/or other content sources to license additional content items that can be classified under the content topic. Upon receiving newly-created or newly-licensed content, the content pool manager 1220 may send the new content to the content pool 135 to be processed and stored therein (in the appropriate content topic segment, for example). For example, for a content topic that is determined to be over-represented in the content pool 135, the content pool manager 1220 may automatically send instructions to the content pool 135 to delete or remove certain number of content items classified under the over-represented content topic. In the case where the content items to be removed are licensed from a third party content source, the content pool manager 1220 may interface or communicate with the third party source to terminate or modify the existing license with respect to the removed content items.

Figure 13:
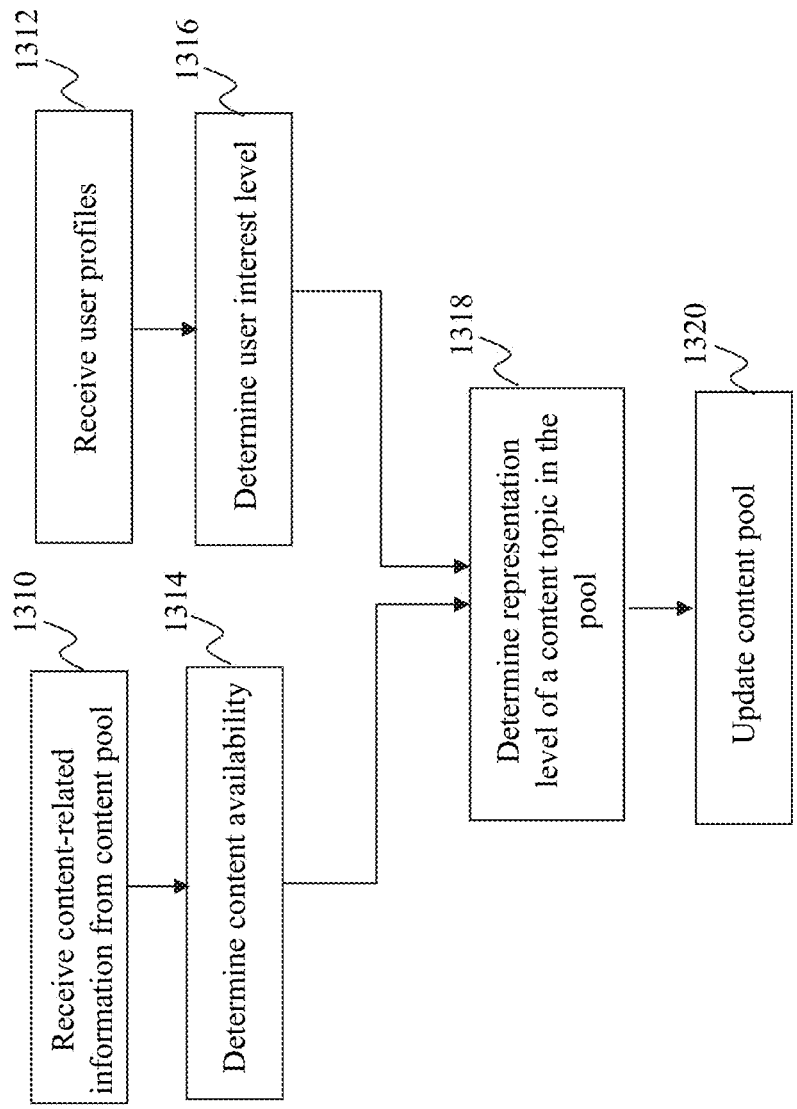
FIG. 13 is a flowchart of an exemplary process for the system of FIG. 12, according to an embodiment of the present teaching.

FIG. 13 is a flowchart of an exemplary process for the system 1200, according to an embodiment of the present teaching. In some implementations, the content representation assessment unit 1210, at 1310, receives or retrieves information from the content pool 135 related to the pool's content items, and at 1312, receives the user profiles 160 from the database 1225. At 1314, the content representation assessment unit 1210, for each content topic, determines a measure of availability of content related to the content topic. At 1316, the content representation assessment unit 1210 determines a level of interest of the users in the content topic based on the user profiles. At 1318, the content representation assessment unit 1210 determines a level of representation of the content topic in the content pool 135 based at least on the determined availability of content and the determined level of user interest. At 1320, for each content topic assessed by the content representation assessment unit 1210, the content pool manager 1220 updates (i.e., adds or removes) at least some of the content items in the content pool 135 related to the content topic.

Figure 14:
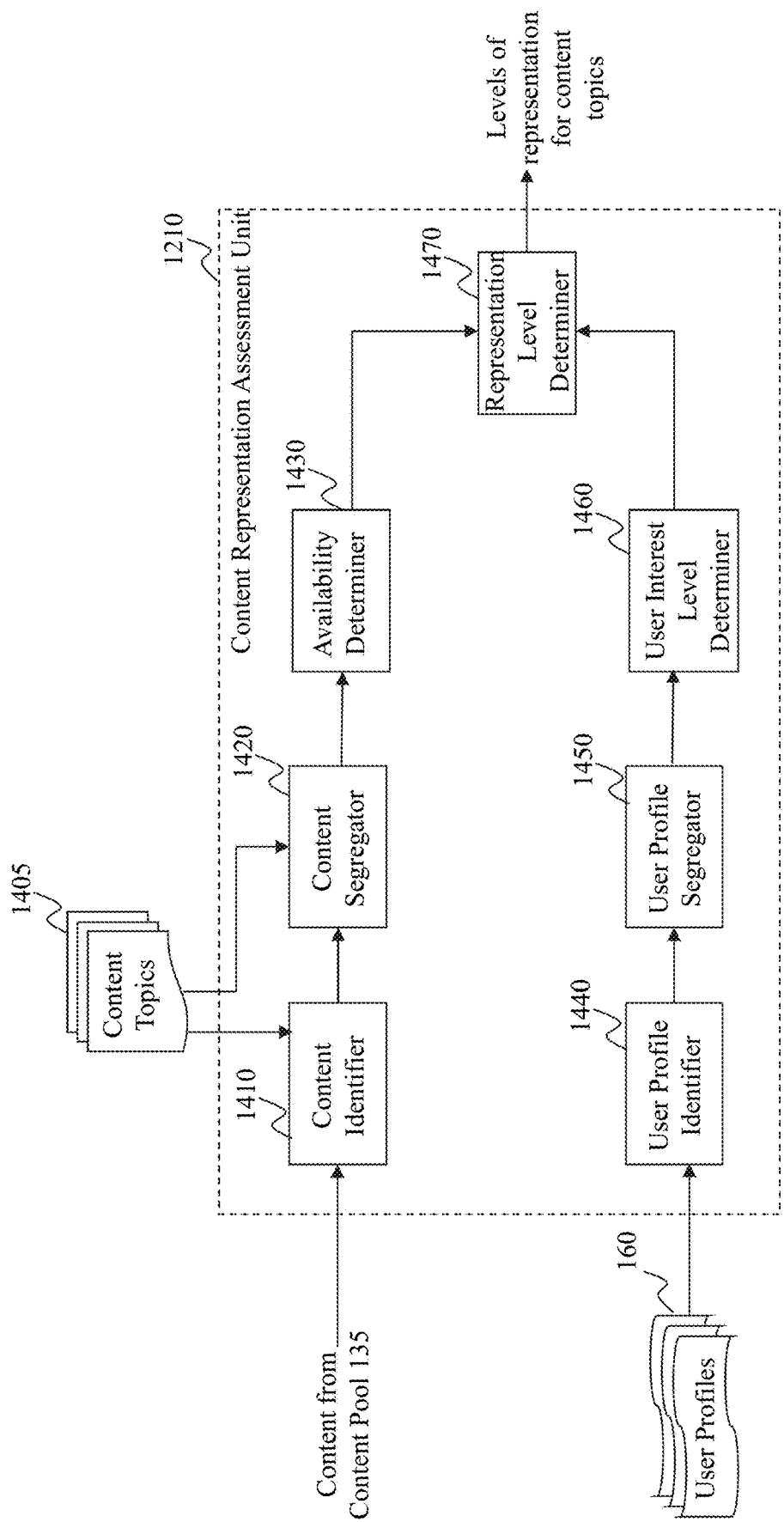
FIG. 14 depicts an exemplary diagram of a content representation assessment unit, according to an embodiment of the present teaching.

FIG. 14 depicts an exemplary diagram of the content representation assessment unit 1210, according to an embodiment of the present teaching. As shown, the content representation assessment unit 1210 may include a content identifier 1410, a content segregator 1420, an availability determiner 1430, a user profile identifier 1440, a user profile segregator 1450, an interest level determiner 1460, and a representation-level determiner 1470. Although, as discussed above, content items in the content pool 135 may be segmented according to their associated content topics, it is not necessary that such segmentation or grouping occurs at the content pool 135. So in the event the content items are not grouped according to their topics, the content identifier 1410 and the content segregator 1420 may be used to assess the content items and classify them under their respective content topics at the content representation assessment unit 1210. For example, the content identifier 1410 may receive content items and/or attributes related to the content items from the content pool 135, and identify the content topics with which each content item is associated based on the attribute values in the attribute vector and possible content topics received from a content topic database 1405. The content segregator 1420 may interface with the content identifier 1410 to receive the content topic information for all of the content items in the content pool 135, and segregate or separately classify/tag the content items under their respective content topics. The availability determiner 1430, as discussed in detail below with respect to FIG. 16, may determine, for each content topic, a level or measure of availability of content in the content pool 135 related to the content topic.

Further, as discussed above, user profiles 160 may be grouped and stored in the database 1225 according to their associated content topics, but it is not necessary that such grouping of user profiles occurs at the database 1225. So in the event the user profiles 160 are not grouped according to their related topics, the user profile identifier 1440 and the user profile segregator 1450 may be used to assess the user profiles and classify them under their respective content topics at the content representation assessment unit 1210. For example, the user profile identifier 1440 may receive the user profiles 160, and identify the content topics associated with each user profile 160 as indicated, e.g., by user's declared interests and/or inferred interests from user's past activity with the content items in the user interest vector. The user profile segregator 1450 may receive the content topic information for all of the user profiles 160, and segregate or separately classify/tag the user profiles 160 under their respective content topics. The interest level determiner 1460, as discussed in detail below with respect to FIGS. 18a and 18b, may determine, for each content topic, a level of interest of the users in the content topic based at least on information in the user profiles 160, e.g., information about user interaction with the content items.

Figure 20:
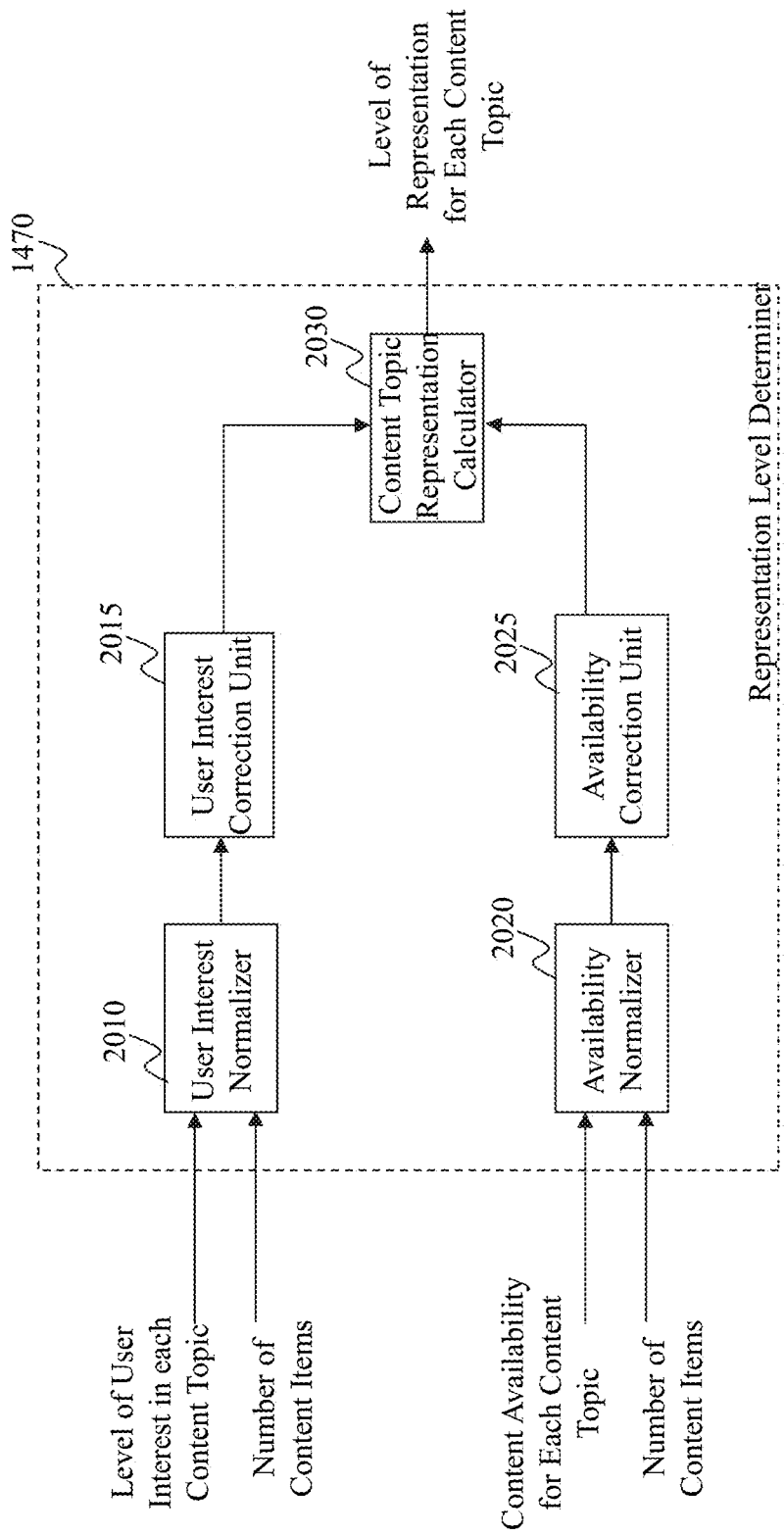
FIG. 20 depicts an exemplary diagram of a representation-level determiner, according to an embodiment of the present teaching.

The representation-level determiner 1470, as discussed in detail with respect to FIG. 20, may determine, for each content topic, a level of representation of the content topic in the content pool 135 based at least on the measure of availability of content for the content topic (from the availability determiner 1430) and the level of user interest in the content topic (from the interest level determiner 1460). The representation-level determiner 1470 may provide its output, i.e., the levels of content topic representation, to the content pool manager 1220 for processing.

Figure 15:
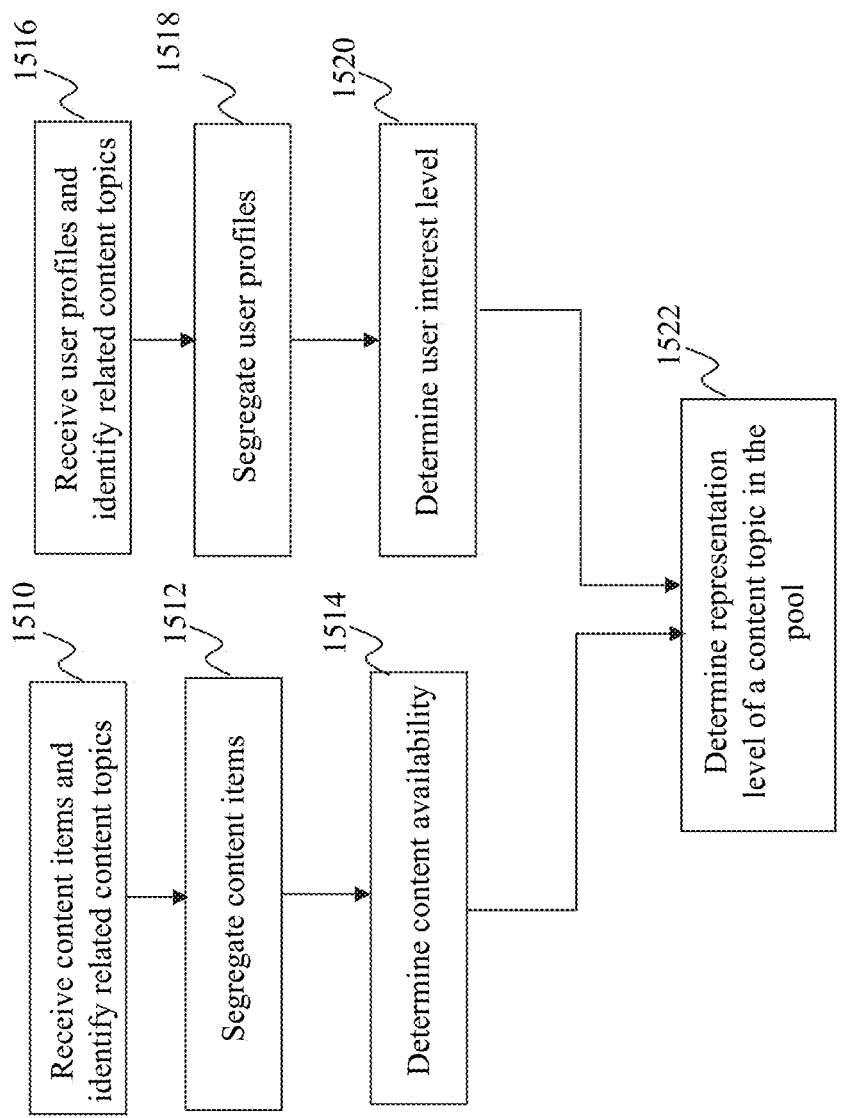
FIG. 15 is a flowchart of an exemplary process for the content representation assessment unit, according to an embodiment of the present teaching.

FIG. 15 is a flowchart of an exemplary process for the content representation assessment unit, according to an embodiment of the present teaching. At 1510, the content identifier 1410 receives content items and/or attributes related to the content items from the content pool 135 and identifies the content topics with which each content item is associated based on the attribute values and possible content topics. At 1512, the content segregator 1420 segregates or separately classifies the content items under their respective content topics. At 1514, the availability determiner 1430 determines, for each content topic, a measure of availability of content in the content pool 135 related to the content topic. At 1516, the user profile identifier 1440 receives the user profiles 160, and identifies the content topics associated with each user profile 160 as indicated, e.g., by user's declared interests and/or inferred interests. At 1518, the user profile segregator 1450 receives the content topic information for all of the user profiles 160, and segregates the user profiles 160 under their respective content topics. At 1520, the interest level determiner 1460 determines, for each content topic, a level of interest of the users in the content topic based at least on information in the user profiles 160, e.g., information about user interaction with the content items. At 1522, the representation-level determiner 1470 determines, for each content topic, a level of representation of the content topic in the content pool 135 based at least on the measure of availability of content for the content topic and the level of user interest in the content topic.

Figure 16:
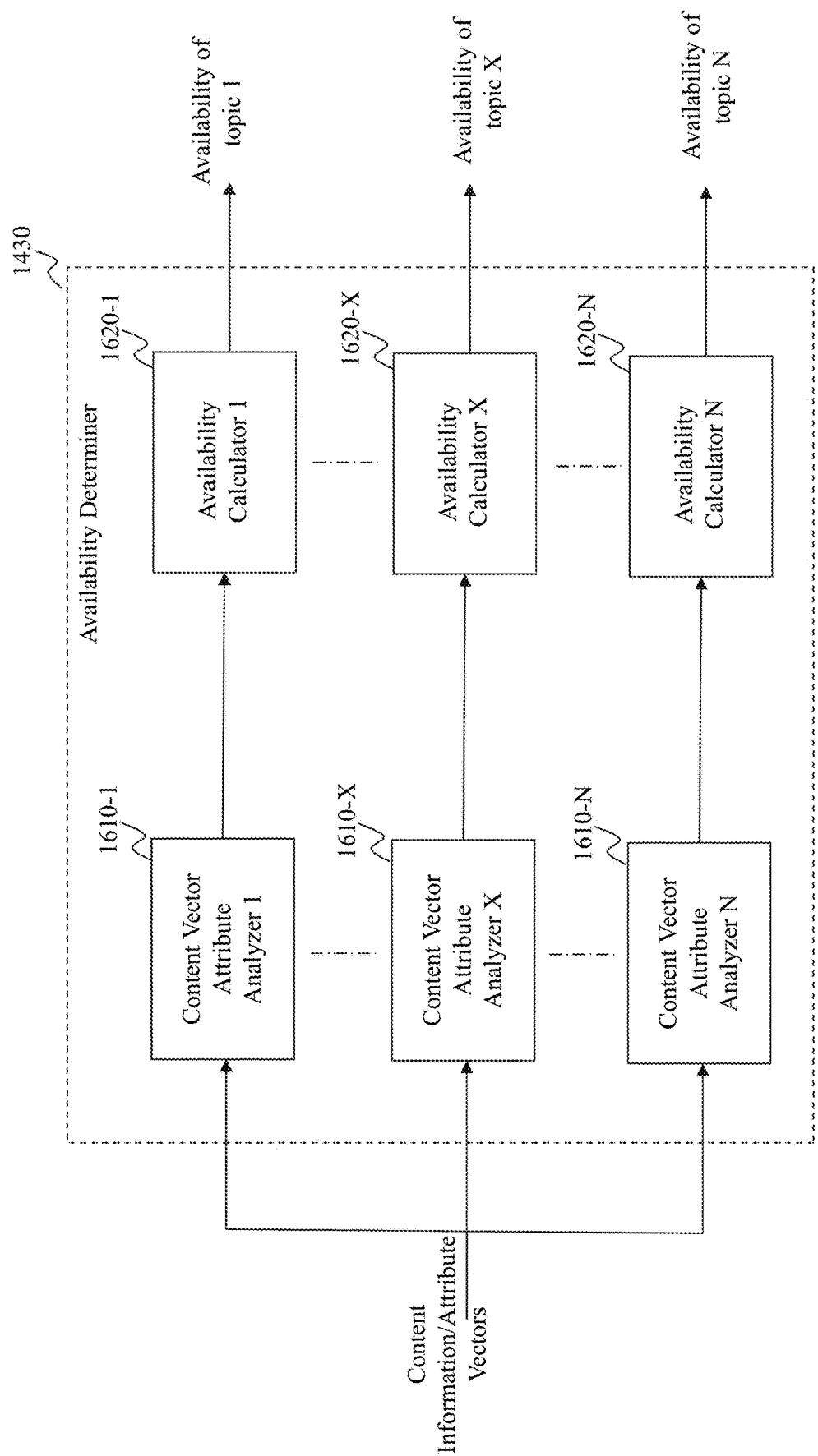
FIG. 16 depicts an exemplary diagram of an availability determiner, according to an embodiment of the present teaching.

FIG. 16 depicts an exemplary diagram of the availability determiner 1430, according to an embodiment of the present teaching. As shown, the availability determiner 1430 may include attribute analyzers 1610-1, 1610-2 ... 1610-N, each corresponding to one content topic associated with content in the content pool 135. The availability determiner 1430 may further include availability calculators 1620-1, 1620-2 ... 1620-N, each corresponding to one content topic. N is the total number of content topics to be assessed for the content pool 135. In some implementations, an attribute analyzer 1610-X may receive from the content segregator 1420 (or directly from the content pool 135) information, e.g., content vectors, for all of the content items related to the content topic X. (X is a number between 1 and N including 1 and N.)

As discussed above, each attribute of the content vector corresponds to a content topic and the value of the attribute indicates whether and/or to what degree the content item is related to the content topic. To that end, for each content item, the attribute analyzer 1610-X may retrieve or extract the value of the attribute corresponding to the topic X from the content vector, and provide the attribute value to the corresponding availability calculator 1620-X. The attribute value may indicate a measure of relevance of the content item to the content topic based at least on content classification information indicated by the vector of the content item. The availability calculator 1620-X, for each content topic X, may combine the attribute values provided by the attribute analyzer 1610-X to determine a measure of availability of content related to the content topic X. The availability calculator 1620-X may add, multiply or perform any other (linear or non-linear) mathematical function on the attribute values to obtain the availability measure for the topic X.

Figure 17:
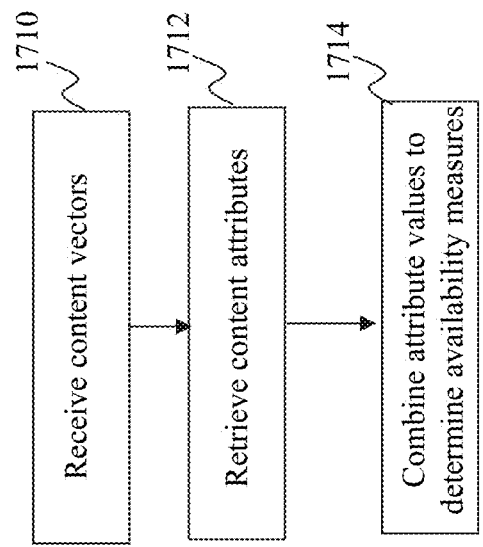
FIG. 17 is a flowchart of an exemplary process for the availability determiner, according to an embodiment of the present teaching.

FIG. 17 is a flowchart of an exemplary process for the availability determiner, according to an embodiment of the present teaching. At 1710, an attribute analyzer 1610-X receives from the content segregator 1420 (or directly from the content pool 135) information, e.g., content vectors, for all of the content items related to the content topic X. For each content item, the attribute analyzer 1610-X, at 1712, retrieves the value of the attribute corresponding to the topic X from the content vector, and provide the attribute value to the corresponding availability calculator 1620-X. At 1714, the availability calculator 1620-X, for each content topic X, combines (e.g., using a mathematical operation) the attribute values provided by the attribute analyzer 1610-X to determine a measure of availability of content related to the content topic X.

Figure 18A:
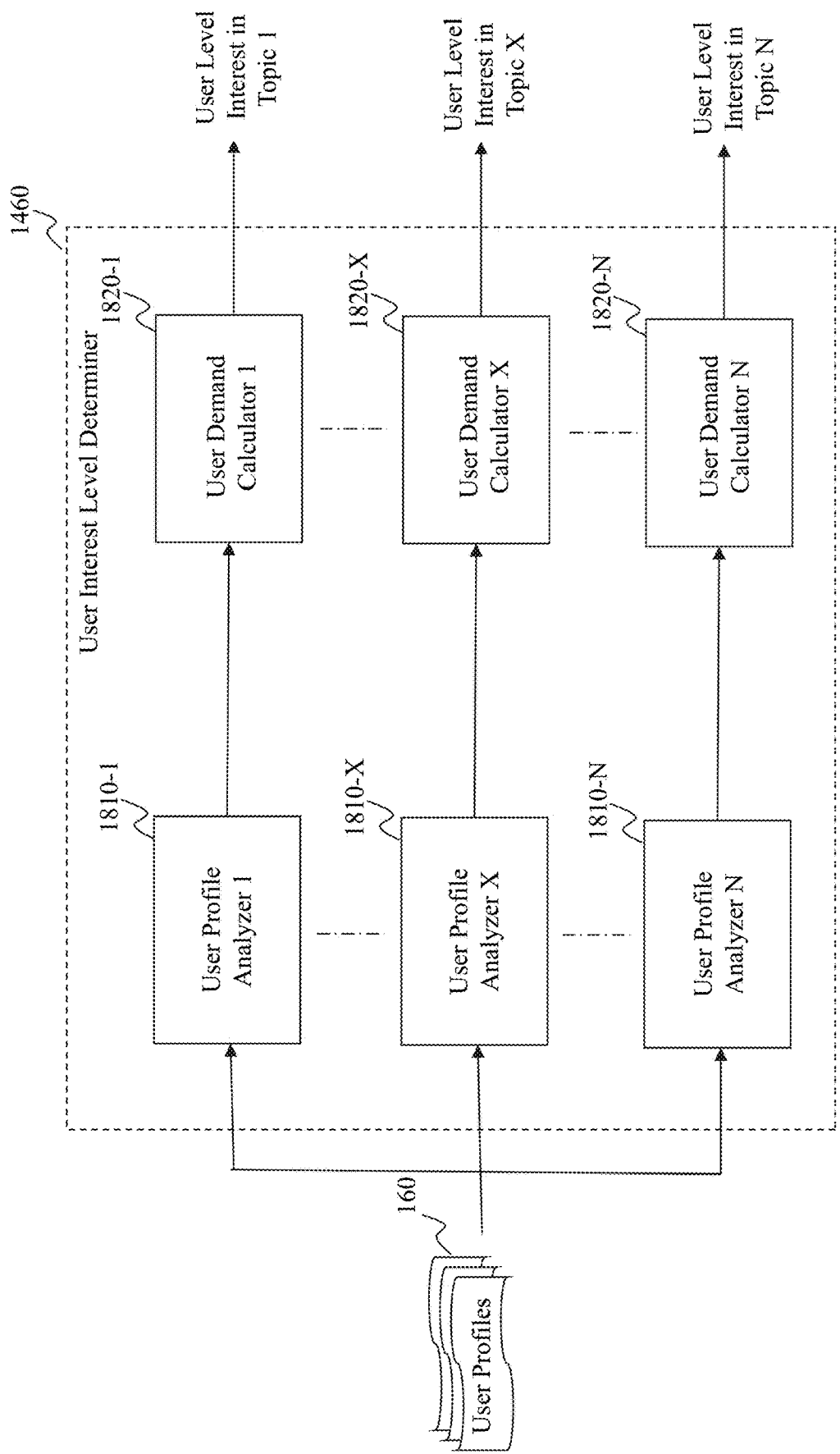
FIGS. 18a,18b depict exemplary diagrams of an interest level determiner and a profile analyzer, respectively, according to an embodiment of the present teaching.

FIG. 18a depicts an exemplary diagram of the interest level determiner 1460, according to an embodiment of the present teaching. As shown, the interest level determiner 1460 may include profile analyzers 1810-1, 1810-2 ... 1810-N, each corresponding to one content topic for content in the content pool 135. The interest level determiner 1460 may further include user demand calculators 1820-1, 1820-2 ... 1820-N, each corresponding to one content topic. N is the total number of content topics to be assessed for the content pool 135. In some implementations, a profile analyzer 1810-X may receive from the user profile segregator 1450 (or directly from the database 1225) information, e.g., user interest vectors, for the entire user profiles 160 related to the content topic X.

Each attribute of the user interest vector of a user may correspond to a content topic and the value of the attribute indicates whether and/or to what degree the user is interested in the content topic. The attribute value in the user interest vector may be based on the user's personal or demographics information and information related to the user's interaction with the content items in the content pool 135. The profile analyzers 1810-X may retrieve or extract the value of the attribute corresponding to the topic X from the user interest vector of a specific user, and provide the attribute value to the corresponding demand calculator 1820-X. The demand calculator 1820-X, for each content topic X, may combine the attribute values of a set of users provided by the profile analyzers 1810-X to determine a level of interest of the set of users in the content topic X. The demand calculator 1820-X may add, multiply or perform any other (linear or non-linear) mathematical function on the attribute values of the user interest vectors to obtain the level of user interest in the topic X.

Figure 18B:
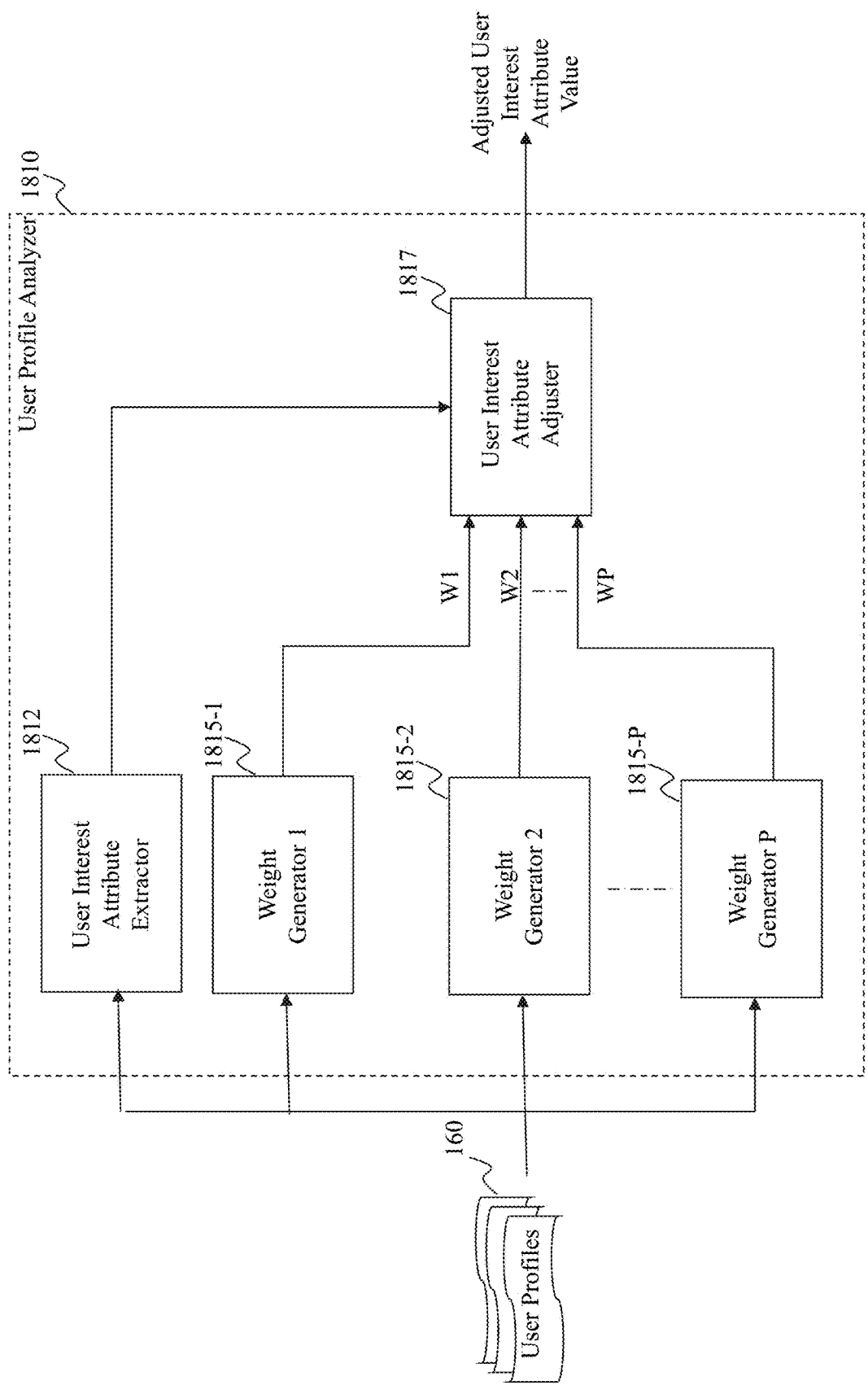

FIG. 18b depicts an exemplary diagram of one of the profile analyzers, according to an embodiment of the present teaching. In some implementations, the degree of interest a user has in a topic X as indicated by a respective attribute of the user's interest vector may be adjusted based on a potential significance or importance of the user to the content provider. For example, many websites are driven or funded by advertising. Let's say there are two users of a particular website—one is a 10-year-old who the advertisers can't target because of various several laws, and the other user is a 40-year-old multi-millionaire female who is interested in buying several expensive items. So, the fact that the 40-year-old female multi-millionaire is interested in a particular topic might be weighted much more heavily than the fact that the 10-year-old is interested in the same topic. As another example, whether a user is a subscriber, whether he or she is more likely to sign up for more expensive services, and/or other factors may be considered in adjusting the attribute of the user's interest vector. For example, for a website like Amazon.com, their Prime members may be considered more valuable than members who don't subscribe to their Prime service. In this regard, a profile analyzer 1810-X as shown in FIG. 18b may include an attribute extractor 1812-X configured to extract or retrieve the value of the attribute corresponding to the topic X from the received user profile.

The profile analyzer 1810-X may further include weight generators 1815-1, 1815-2, ..., 1815-P, where P is the total number of different weight values used to adjust the extracted interest-vector attribute, and a user interest attribute adjuster 1817. Each weight generator 1815 may receive the user profile and based on a specific information provided by the user profile, generate a value of a weight w. For example, weight generator 1815-1 may be configured to process the user profile and generate weight w1 based on how much content the user the consumes at the content provider's website. Similarly, weight generator 1815-2 may generate weight w2 based on how often the user visits the website. Weight generator 1815-3 may generate weight w3 based on how much revenue the user generates at the website. Weight generator 1815-P may generate weight wP based on certain user's characteristics such as age, perceived spending power, type and number of subscriptions that the user has at the website, etc.

The extracted interest attribute value and weight values w1, w2, . . . , wP are provided as inputs to the attribute adjuster 1817, which combines the inputs to generate an adjusted interest attribute value for the respective user. In some implementations, to combine its inputs, the attribute adjuster 1817 may first process the weight values w1, w2, . . . , wP together, e.g., compute a sum, an average or perform any other (linear or non-linear) mathematical function on w1, w2, . . . , wP to obtain a combined weight value $w_{combined}$. The attribute adjuster 1817 may then multiply the combined weight value $w_{combined}$ with the interest attribute value to generate the adjusted interest attribute value as its output. The attribute adjuster 1817, however, may perform any other (linear or non-linear) mathematical function on the combined weight value $w_{combined}$ and the interest attribute value to generate the adjusted user interest attribute value. The attribute adjuster 1817 may provide its output to demand calculator 1820-X for combining adjusted interest attribute values (instead of original interest attribute values) as discussed above to obtain the level of user interest in the topic X.

Figure 19:
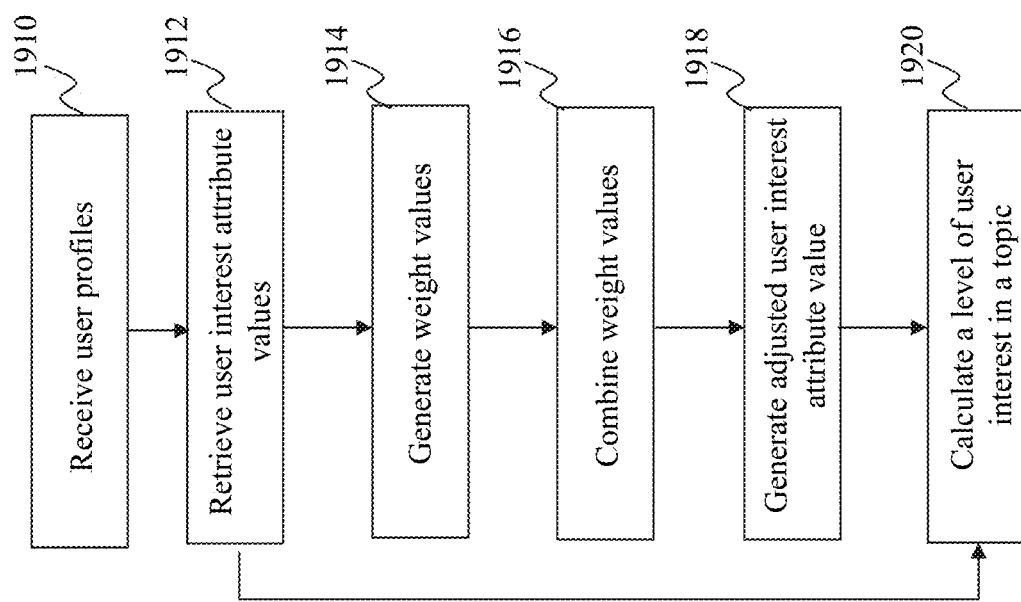
FIG. 19 is a flowchart of an exemplary process for the interest level determiner and the profile analyzer, according to an embodiment of the present teaching.

FIG. 19 is a flowchart of an exemplary process for the interest level determiner including the profile analyzer, according to an embodiment of the present teaching. At 1910, the profile analyzer 1810-X receives information, e.g., user interest vectors, for the entire user profiles 160 related to the content topic X. At 1912, the profile analyzers 1810-X retrieves the value of the attribute corresponding to the topic X from the user interest vector of a specific user. At 1914, weight generators 1815 receive the user profile and generate values of weights w1 . . . wP. At 1916, the attribute adjuster 1817 combines (using a mathematical operation) the weight values w1, w2, . . . , wP to obtain a combined weight value $w_{combined}$. At 1918, the attribute adjuster 1817 multiplies the combined weight value $w_{combined}$ with the interest attribute value to generate the adjusted user interest attribute value. At 1920, the demand calculator 1820-X, for each content topic X, combines (using a mathematical operation) the attribute values of a set of users provided by the profile analyzers 1810-X to determine a level of interest of the set of users in the content topic X. In some implementations, however, at 1920, instead of combining original interest attribute values, the demand calculator 1820-X combines (using a mathematical operation) the adjusted attribute values to obtain the level of user interest in the topic X.

FIG. 20 depicts an exemplary diagram of the representation-level determiner 1470, according to an embodiment of the present teaching. As shown, the representation-level determiner 1470 may include a user interest normalizer 2010, a user interest correction unit 2015, an availability normalizer 2020, an availability correction unit 2025, and a content topic representation calculator 2030. The interest normalizer 2010 may receive the level of user interest for the content topic X (from the interest level determiner 1460) and the total number of content items considered to obtain the level of user interest. The interest normalizer 2010 may then normalize the level of user interest with respect to the number of content items, i.e., divide level of user interest with the number of content items. Further, the interest correction unit 2015 may multiply the normalized user interest level with a constant value 'a', or exponentially raise the normalized user interest level by a constant value 'a' (where 'a' is a real number), and provide the corrected normalized user interest level to the topic representation calculator 2030. This correction using the constant a may signify a correction of the user interest level where the user interest level (or demand) of content items for the topic X may have been underestimated.

The availability normalizer 2020 may receive the measure of content availability for the content topic X (from the availability determiner 1430) and the total number of content items considered to obtain the content availability measure. The availability normalizer 2010 may then normalize the content availability measure with respect to the number of content items, i.e., divide availability measure with the number of content items. Further, the availability correction unit 2025 may multiply the normalized availability measure with a constant value or exponentially raise the normalized availability measure by a constant value 'b' (where 'b' is a real number), and provide the corrected normalized availability measure to the topic representation calculator 2030. This correction using the constant b may signify a correction of the availability measure where the availability (or supply) of content items for the topic X may have been underestimated.

The topic representation calculator 2030 may calculate a ratio between the corrected normalized user interest level and the corrected normalized availability measure to determine the level of representation of the content topic X in the content pool 135 as its output. The topic representation calculator 2030, however, may perform any other (linear or non-linear) mathematical function on the corrected normalized user interest level and the corrected normalized availability measure to determine the level of representation of the content topic X. The higher the value of the level of representation of a content topic X, the higher is the degree to which the content topic X is under-represented in the content pool 135, i.e., the content pool 135 should add for content for the content topic X to satisfy user's interest level or demand. Similarly, the lower the value of the level of representation of a content topic X, the higher is the degree to which the content topic X is over-represented in the content pool 135, i.e., the content pool 135 should remove content for the content topic X to match user's interest level or demand in that topic.

Figure 21:
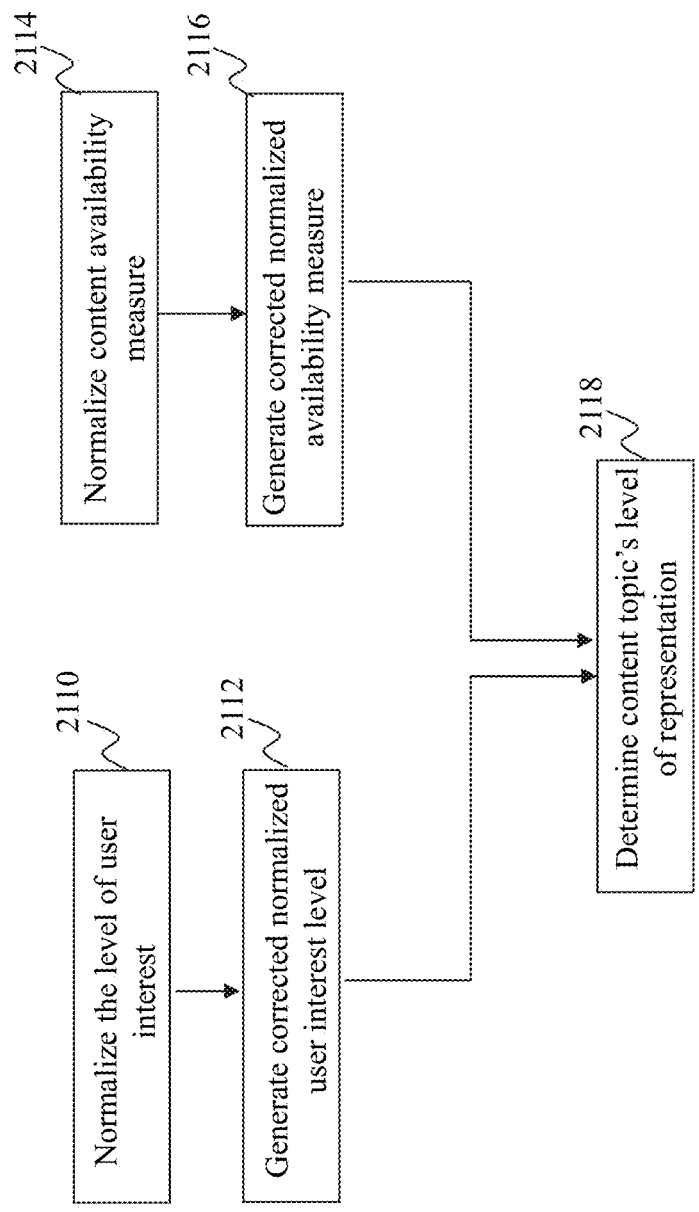
FIG. 21 is a flowchart of an exemplary process for the representation-level determiner, according to an embodiment of the present teaching.

FIG. 21 is a flowchart of an exemplary process for the representation-level determiner, according to an embodiment of the present teaching. At 2110, the interest normalizer 2010 normalizes the level of user interest with respect to the number of content items, i.e., divide level of user interest with the number of content items. At 2112, the interest correction unit 2015 multiplies the normalized user interest level with a constant value a, or exponentially raises the normalized user interest level by a constant value a, and provides the corrected normalized user interest level. At 2114, the availability normalizer 2020 normalizes the content availability measure with respect to the number of content items, i.e., divide availability measure with the number of content items. At 2116, the availability correction unit 2025 multiplies the normalized availability measure with a constant value b, or exponentially raises the normalized availability measure by a constant value b, and provides the corrected normalized availability measure. At 2118, the topic representation calculator 2030 calculates a ratio between the corrected normalized user interest level and the corrected normalized availability measure to determine the level of representation of the content topic X in the content pool 135.

Figure 22:
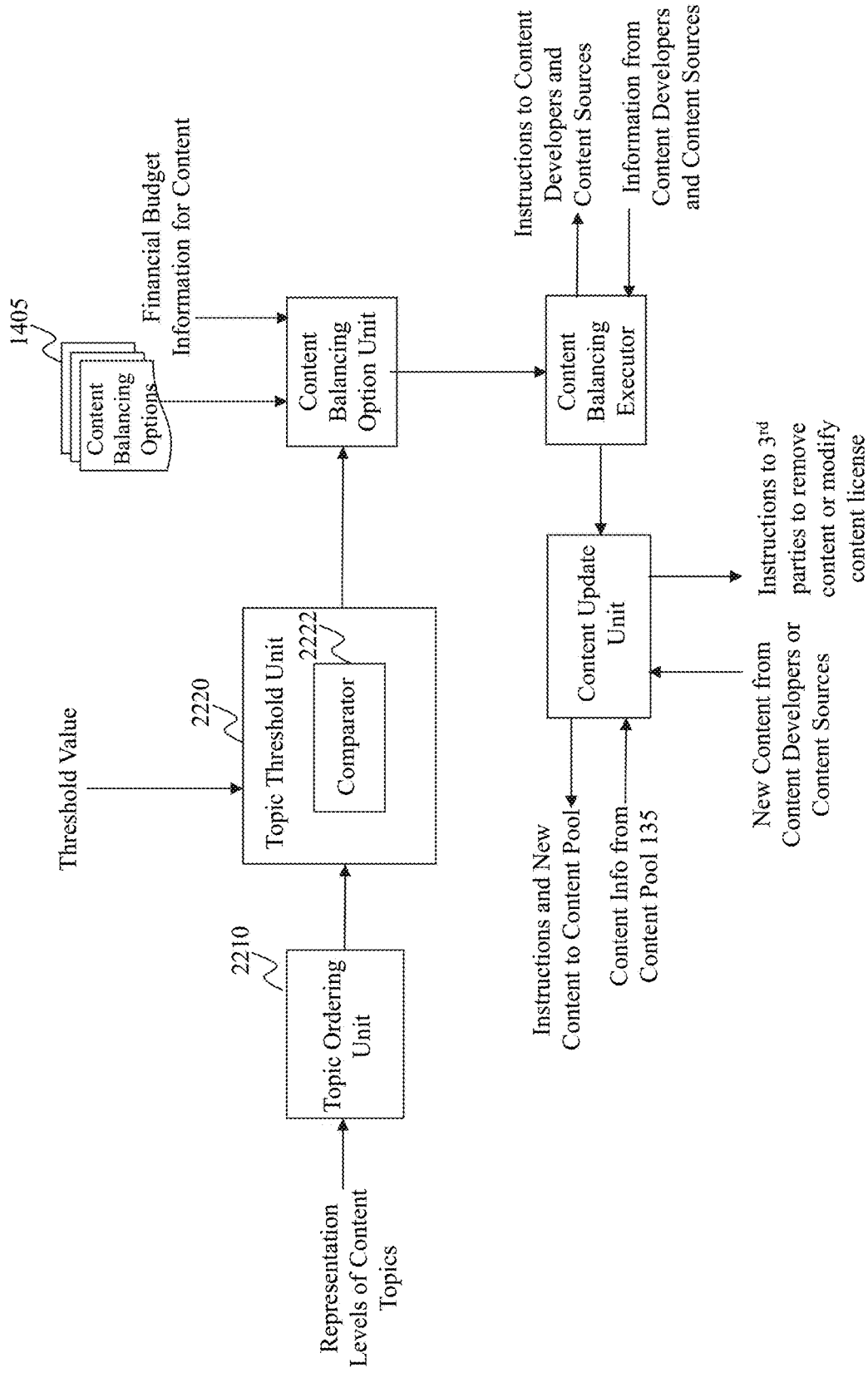
FIG. 22 depicts an exemplary diagram of a content pool manager, according to an embodiment of the present teaching.

FIG. 22 depicts an exemplary diagram of the content pool manager 1220, according to an embodiment of the present teaching. As shown, the content pool manager 1220 may include a topic ordering unit 2210, a topic thresholding unit 2220, a balancing option unit 2230, a content balancing executor 2240, a content update unit 2250. The topic ordering unit 2210 may receive, from the representation-level determiner 1470, N levels of representation for each of content topics 1, 2, . . . , N. The topic ordering unit 2210 may then order or sort the N levels of representation according their respective values in an ascending or descending order. The topic thresholding unit 2220 may apply a threshold value of the ordered N levels of representation such that, for example, only the content topics that have the respective levels of representation greater than the threshold are further processed for content balancing. In some implementations, the topic thresholding unit 2220 may include a comparator 2222 to compare each level of representation with the threshold. The comparator 2222 may tag or identify the content topic as under-represented for which the level of representation is at least equal to the threshold and tag or identify the content topic as over-represented for which the level of representation is less than the threshold.

The balancing option unit 2230 may consider one or more content balancing options under specific financial budget provided to maintain content in the content pool 135. For example, for a content topic (from among the thresoled list of topics) that has a higher level of representation indicating a higher degree of under-representation, the balancing option unit 2230 may consider one or more content balancing options to add content for that content topic within the constraints of the given budget. As a balancing option, the balancing option unit 2230 may choose adding and/licensing new content for the content topic. Further, for a content topic that has a lower level of representation indicating a higher degree of over-representation, the balancing option unit 2230 may consider one or more content balancing options to remove content for that content topic from the content pool. By removing some existing content, the portion of the budget that is being spent on the over-represented content may become available to add new content for the under-represented topics. As a balancing option, the balancing option unit 2230 may choose a specific content source with whom an existing licensing deal or contract would have to be terminated to remove their content from the content pool 135.

Based on the selected balancing option, the content balancing executor 2240 may consider content sources including third-party content providers to add or remove content from the content pool. To execute content addition, the content balancing executor 2240 may automatically communicate content developers to develop new content for a specific under-represented content topic. The content balancing executor 2240 may also automatically communicate or interface with one or more of content providers, content aggregators, social networks and/or other content sources to license additional content items that can be classified under the specific content topic. The content update unit 2250 may receive newly-created or newly-licensed content, and send the new content to the content pool 135 to be processed and stored therein. For example, for an over-represented content topic, the content update unit 2250 may automatically send instructions to the content pool 135 to delete or remove certain number of content items classified under the over-represented content topic. In the case where the content items to be removed are licensed from a third party content source, the content update unit 2250 may interface or communicate with the third party source to terminate or modify the existing license with respect to the removed content items.

Figure 23:
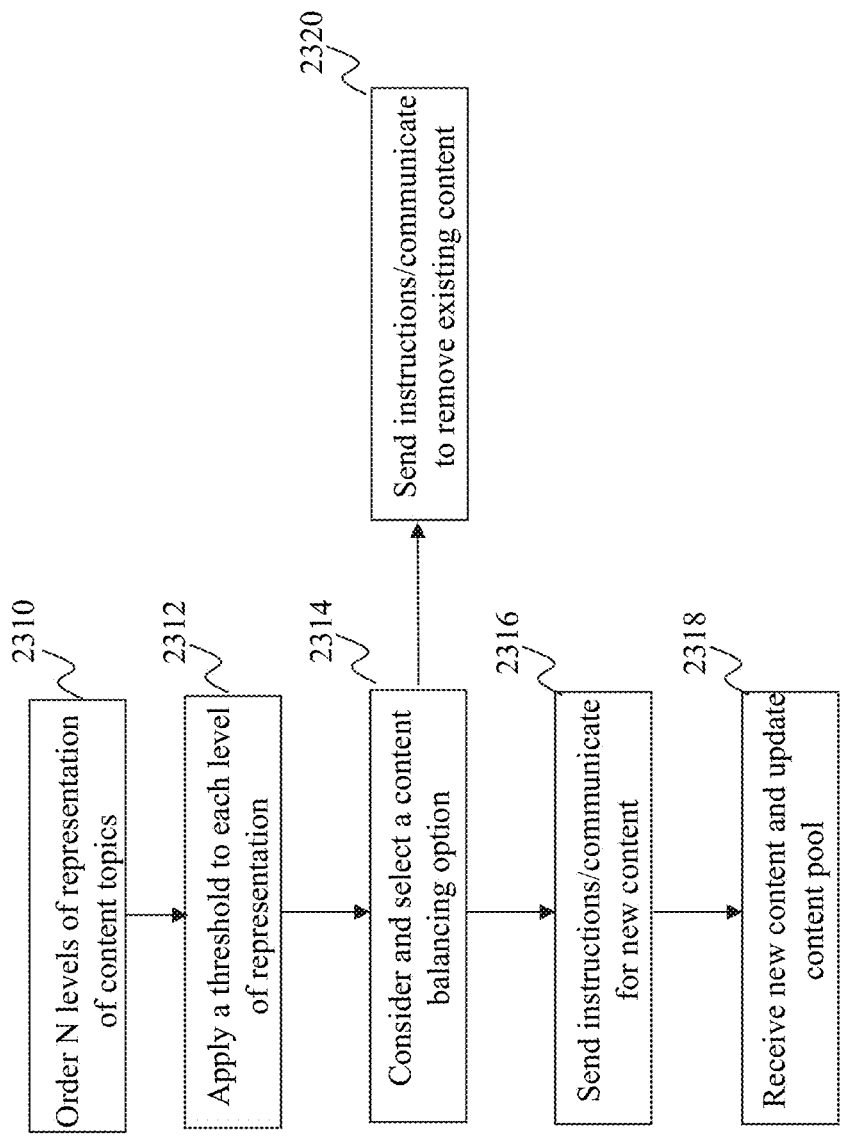
FIG. 23 is a flowchart of an exemplary process for the content pool manager, according to an embodiment of the present teaching.

FIG. 23 is a flowchart of an exemplary process for the content pool manager, according to an embodiment of the present teaching. At 2310, the topic ordering unit 2210 orders or sorts the N levels of representation according their respective values in an ascending or descending order. At 2312, the topic thresholding unit 2220 applies a threshold value of the ordered N levels of representation. For example, the comparator 2222 tags the content topic as under-represented for which the level of representation is at least equal to the threshold, and tags the content topic as over-represented for which the level of representation is less than the threshold. At 2314, the balancing option unit 2230 considers one or more content balancing options under specific financial budget provided to maintain content in the content pool 135. For example, for a content topic that has a higher level of representation indicating a higher degree of under-representation, the balancing option unit 2230 considers a balancing option to add content for that content topic Further, for a content topic that has a lower level of representation indicating a higher degree of over-representation, the balancing option unit 2230 considers a balancing option to remove content for that content topic from the content pool.

At 2316, the content balancing executor 2240 automatically communicates with content developers to develop new content for a specific under-represented content topic. At 2316, the content balancing executor 2240 also automatically communicates with one or more of content providers, content aggregators, social networks and/or other content sources to license additional content items that can be classified under the specific content topic. At 2318, the content update unit 2250 receives newly-created or newly-licensed content, and sends the new content to the content pool 135 to be processed and stored therein. At 2320, for an over-represented content topic, the content update unit 2250 automatically sends instructions to the content pool 135 to delete or remove certain number of content items classified under the over-represented content topic. In the case where the content items to be removed are licensed from a third party content source, the content update unit 2250 communicates with the third party source to terminate or modify the existing license with respect to the removed content items.

Figure 24:
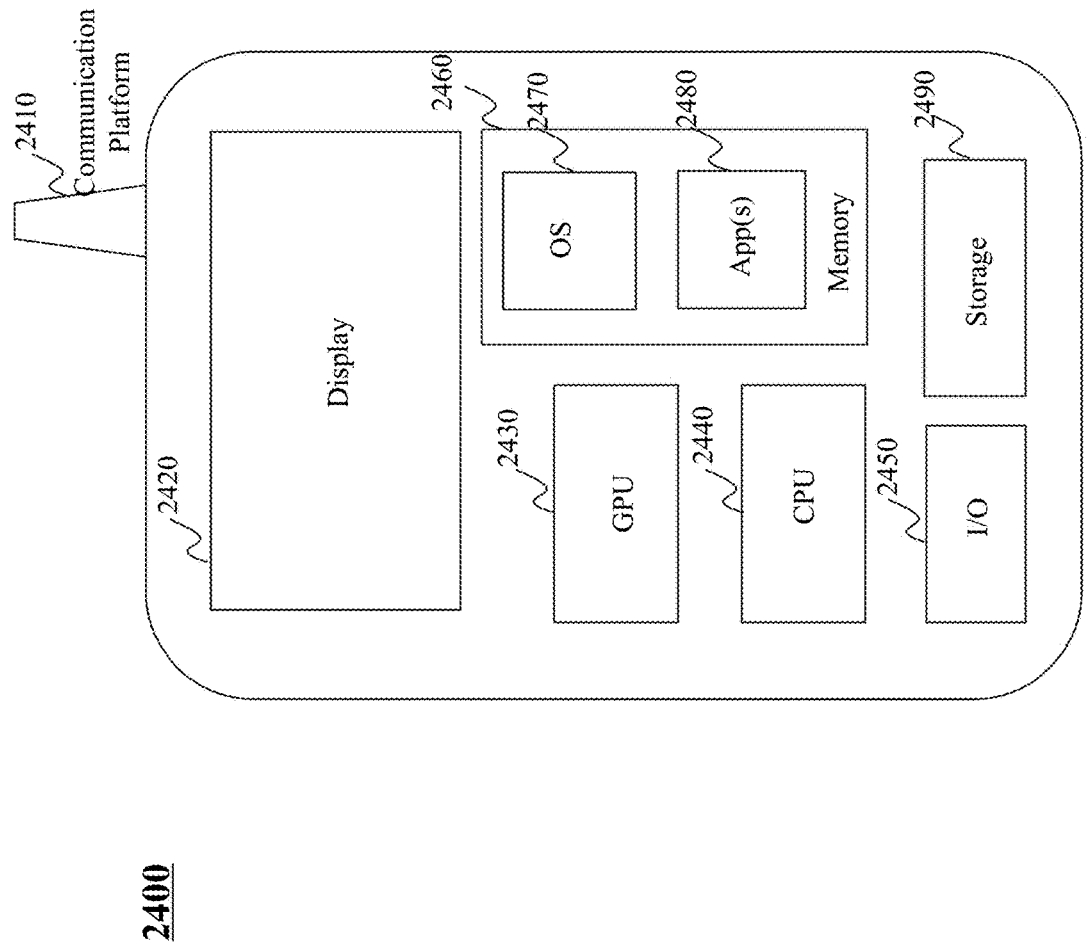
FIG. 24 depicts the architecture of a mobile device which can be used to implement a specialized system incorporating teachings of the present disclosure.

FIG. 24 depicts the architecture of a mobile device which can be used to realize a specialized system implementing the present teachings. In this example, the user device is a mobile device 2400, including, but is not limited to, a smartphone, a tablet, a music player, a handled gaming console, a global positioning system (GPS) receiver, and a wearable computing device (e.g., eyeglasses, wrist watch, etc.), or in any other form factor. The mobile device 2400 in this example includes one or more central processing units (CPUs) 2402, one or more graphic processing units (GPUs) 2404, a display 2406, a memory 2408, a communication platform 2410, such as a wireless communication module, storage 2412, and one or more input/output (I/O) devices 2414. Any other suitable component, including but not limited to a system bus or a controller (not shown), may also be included in the mobile device 2400. As shown in FIG. 24, a mobile operating system 2416, e.g., iOS, Android, Windows Phone, etc., and one or more applications 2418 may be loaded into the memory 2408 from the storage 2412 in order to be executed by the CPU 2402. The applications 2418 may include a browser or any other suitable mobile apps for receiving and rendering content streams and advertisements on the mobile device 2400.

To implement various modules, units, and their functionalities described in the present disclosure, computer hardware platforms may be used as the hardware platform(s) for one or more of the elements described above. The hardware elements, operating systems and programming languages of such computers are conventional in nature, and it is presumed that those skilled in the art are adequately familiar therewith to adapt those technologies to infer user identity across different applications and devices, and create and update a user profile based on such inference. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 25:
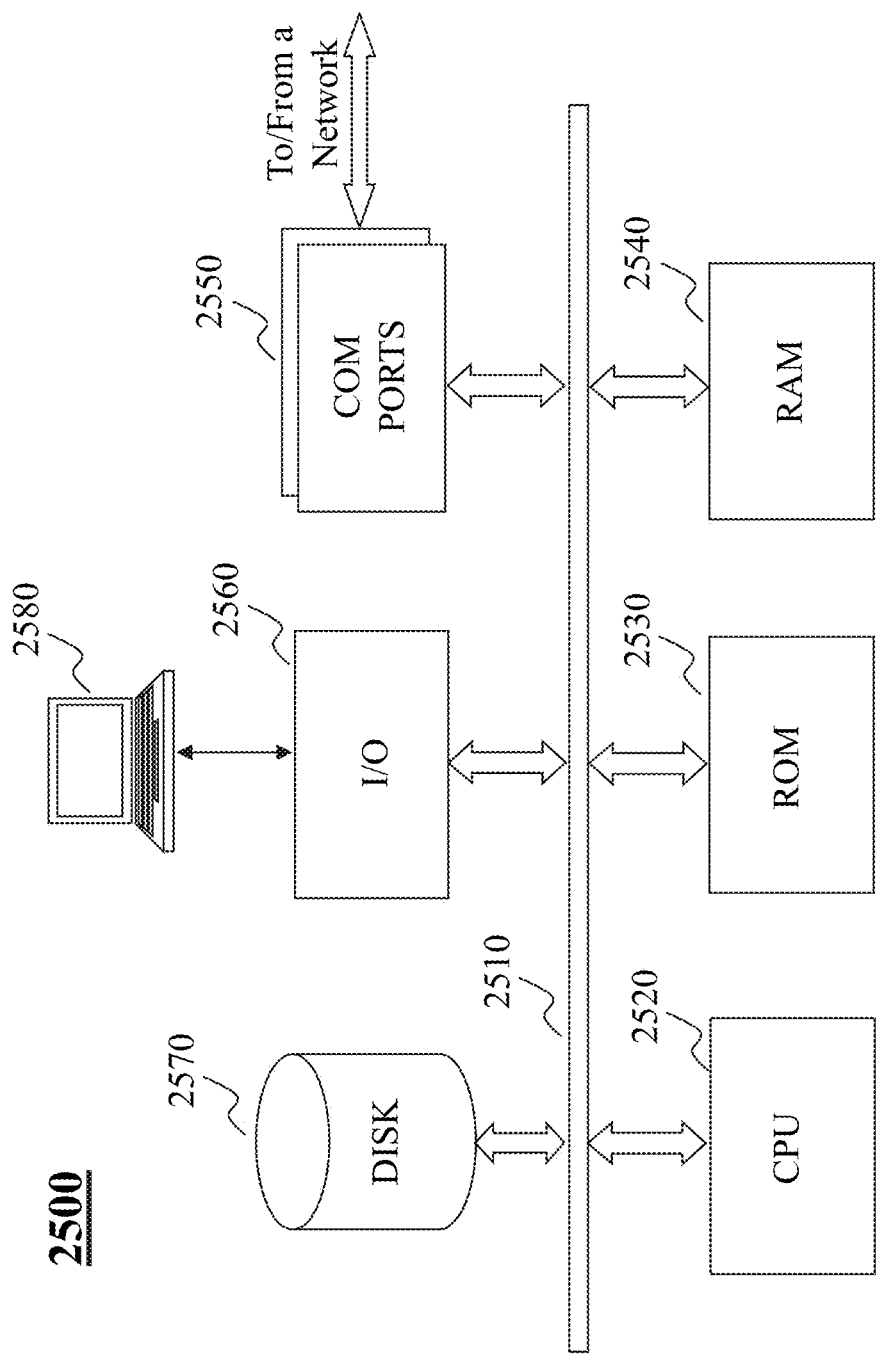
FIG. 25 depicts the architecture of a computer which can be used to implement a specialized system incorporating teachings of the present disclosure.

FIG. 25 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 2500 may be used to implement components of the disclosed systems and apparatuses, via its hardware, software program, firmware, or a combination thereof. Although only one such computer is shown, for convenience, the computer functions relating to managing representation of content topics as described herein may be implemented in a distributed fashion on a number of similar platforms, to distribute the processing load.

The computer 2500, for example, includes COM ports (or one or more communication platforms) 2550 connected to and from a network connected thereto to facilitate data communications. Computer 2500 also includes a central processing unit (CPU) 2520, in the form of one or more processors, for executing program instructions. The exemplary computer platform includes an internal communication bus 2510, program storage and data storage of different forms, e.g., disk 2570, read only memory (ROM) 2530, or random access memory (RAM) 2540, for various data files to be processed and/or communicated by the computer, as well as possibly program instructions to be executed by the CPU. Computer 2500 also includes an I/O component 2560, supporting input/output flows between the computer and other components therein such as user interface elements 2580. Computer 2500 may also receive programming and data via network communications.

Hence, aspects of the methods of managing representation of content topic, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other user profile and app management server into the hardware platform(s) of a computing environment or other system implementing a computing environment or similar functionalities in connection with access control techniques for shared resources. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method to manage representation of a content topic, implemented on a machine having a processor, a storage unit, and a communication platform capable of making a connection to a network, the method comprising:

determining, using the processor, for each of a plurality of content topics, a number of content items in a content pool classified as being related to the content topic;

determining, using the processor, a level of interest of a set of users in each of the plurality of content topics based on information related to interactions of the set of users with the content items in the content pool;

determining, using the processor, a level of representation of each of the plurality of content topics in the content pool based on a ratio of the number of content items in the content pool classified as being related to each of the plurality of content topics and the level of interest in each of the plurality of content topics; and updating, using the processor, the number of content items in the content pool related to at least some of the plurality of content topics based on the level of representation of each of the plurality of content topics with respect to a threshold for a respective content topic of the plurality of content topics.

2. The method of claim 1, wherein updating the number of content items comprises:

adding one or more content items related to the at least some of the plurality of content topics if the level of representation of each of the plurality of content topics is greater than the threshold for the respective content topic; and deleting one or more content items related to the at least some of the plurality of content topics if the level of representation of each of the plurality of content topics is less than the threshold for the respective content topic.

3. The method of claim 1, wherein determining, for each of the plurality of content topics, the number of content items in the content pool classified as being related to the content topic comprises:

accessing the content items from the content pool; and classifying each of the content items from the content pool into one or more of the plurality of content topics based on content included in a corresponding content item.

4. The method of claim 3, wherein classifying each of the content items from the content pool into the one or more of the plurality of content topics comprises:

characterizing each content item from the content pool into a multidimensional vector, wherein:
each attribute of the multidimensional vector corresponding to one of the plurality of content topics, and
a value of each attribute of the multidimensional vector indicates whether a corresponding content item relates to a corresponding content topic of the plurality of content topics.

5. The method of claim 1, wherein determining the level of representation of each of the plurality of content topics in the content pool comprises:

normalizing the number of content items in the content pool for each of the plurality of content topics with respect to a total number of content items in the content pool;

normalizing the level of interest of the set of users in each of the plurality of content topics with respect to the number of content items in the content pool classified as being related to each of the plurality of content topics; and calculating the ratio based on the normalized number of content items in the content pool related to each of the plurality of content topics and the normalized level of interest of the set of users in each of the plurality of content topics to determine the level of representation of each of the plurality of content topics.

6. The method of claim 1, wherein updating the number of content items in the content pool related to the at least some of the plurality of content topics is further based on a financial budget related to the content pool.

7. The method of claim 1, wherein determining the level of interest of the set of users in each of the plurality of content topics comprises:

receiving, for each user included in the set of users, a user interest vector, wherein:
each attribute of the user interest vector corresponds to one of the plurality of content topics, and
a value of each attribute of the user interest vector indicates whether a corresponding user is interested in a corresponding content topic determined based on user interaction information;

for each of the plurality of content topics:
extracting the value of the attribute associated with the content topic from the user interest vector of each user included in the set of users; and
combining the value of the attribute associated with the content topic to determine the level of interest of the set of users in the content topics.

8. The method of claim 1, further comprising:

obtaining candidate content via a web crawler;

extracting concepts covered by the candidate content;

computing a multidimensional vector of a content profile of the candidate content by mapping the concepts to the plurality of content topics;

determining whether to add the candidate content to the content pool based on the multidimensional vector of the content profile of the candidate content and a user interest vector for each user of the set of users indicating one or more of the plurality of content topics that the user is interested in.

9. A system having memory storing computer program instructions and at least one processor configured to execute the computer program instructions to manage representation of a content topic in a content pool, the system comprising:

a communication platform, implemented by the at least one processor, and configured to receive information related to content items in a content pool and information related to interactions of a set of users with the content items in the content pool;

an availability determiner, implemented by the at least one processor, and configured to determine for each of a plurality of content topics, a number of content items in the content pool classified as being related to the content topic;

an interest determiner, implemented by the at least one processor, and configured to determine a level of interest of the set of users in each of the plurality of content topics based on the information related to interactions of the set of users with the content items in the content pool;

a representation-level determiner, implemented by the at least one processor, and configured to determine a level of representation of each of the plurality of content topics in the content pool based on a ratio of the number of content items in the content pool classified as being related to each of the plurality of content topics and the level of interest in each of the plurality of content topics; and a content pool manager, implemented by the at least one processor, and configured to update the number of content items in the content pool related to at least some of the plurality of content topics based on the level of representation of each of the plurality of content topics with respect to a threshold for a respective content topic of the plurality of content topics.

10. The system of claim 9, further comprising:
a comparator configured to compare the level of representation of each of the plurality of content topics with the threshold for the respective content topic,
wherein the content pool manager is further configured to:
add one or more content items related to the at least some of the plurality of content topics based on a determination from the comparator that the level of representation of each of the plurality of content topics is greater than the threshold for the respective content topic; and
delete one or more content items related to the at least some of the plurality of content topics based on a determination from the comparator that the level of representation of each of the plurality of content topics is less than the threshold for the respective content topic.

11. The system of claim 9, wherein the availability determiner is further configured to:
access the content items from the content pool; and
classify each of the content items from the content pool into one or more of the plurality of content topics based on content included in a corresponding content item.

12. The system of claim 11, wherein the availability determiner is further configured to:
characterize each content item from the content pool into a multidimensional vector, wherein:
each attribute of the multidimensional vector corresponding to one of the plurality of content topics, and
a value of each attribute of the multidimensional vector indicates whether a corresponding content item relates to a corresponding content topic of the plurality of content topics.

13. The system of claim 9, wherein the representation-level determiner is further configured to:
normalize the number of content items in the content pool for each of the plurality of content topics with respect to a total number of content items in the content pool;
normalize the level of interest of the set of users in each of the plurality of content topics with respect to the number of content items in the content pool classified as being related to each of the plurality of content topics; and
calculate the ratio based on the normalized number of content items in the content pool related to each of the plurality of content topics and the normalized level of interest of the set of users in each of the plurality of content topics to determine the level of representation of each of the plurality of content topics.

14. The system of claim 9, wherein the content pool manager is configured to update the number of content items in the content pool related to the at least some of the plurality of content topics further based on a financial budget related to the content pool.

15. The system of claim 9, wherein the interest determiner is further configured to:
receive, for each user included in the set of users, a user interest vector, wherein:
each attribute of the user interest vector corresponds to one of the plurality of content topics, and
a value of each attribute of the user interest vector indicates whether a corresponding user is interested in a corresponding content topic determined based on user interaction information;
for each of the plurality of content topics:
extract the value of the attribute associated with the content topic from the user interest vector of each user included in the set of users; and
combine the value of the attribute associated with the content topic to determine the level of interest of the set of users in the content topics.

16. A machine readable, tangible, and non-transitory medium storing computer program instructions that, when executed by the machine, effectuate operations comprising:
determining, for each of a plurality of content topics, a number of content items in a content pool classified as being related to the content topic;
determining a level of interest of a set of users in each of the plurality of content topics based on information related to interactions of the set of users with the content items in the content pool;
determining a level of representation of each of the plurality of content topics in the content pool based on a ratio of the number of content items in the content pool classified as being related to each of the plurality of content topics and the level of interest in each of the plurality of content topics; and
updating the number of content items in the content pool related to at least some of the plurality of content topics based on the level of representation of each of the plurality of content topics with respect to a threshold for a respective content topic of the plurality of content topics.

17. The medium of claim 16, wherein updating the number of content items comprises:
adding one or more content items related to the at least some of the plurality of content topics if the level of representation of each of the plurality of content topics is greater than the threshold for the respective content topic; and
deleting one or more content items related to the at least some of the plurality of content topics if the level of representation of each of the plurality of content topics is less than the threshold for the respective content topic.

18. The medium of claim 16, wherein determining, for each of the plurality of content topics, the number of content items in the content pool classified as being related to the content topic comprises:
accessing the content items from the content pool; and
classifying each of the content items from the content pool into one or more of the plurality of content topics based on content included in a corresponding content item.

19. The medium of claim 18, wherein classifying each of the content items from the content pool into the one or more of the plurality of content topics comprises:
characterizing each content item from the content pool into a multidimensional vector, wherein:
each attribute of the multidimensional vector corresponding to one of the plurality of content topics, and
a value of each attribute of the multidimensional vector indicates whether a corresponding content item relates to a corresponding content topic of the plurality of content topics.

20. The medium of claim 16, wherein determining the level of representation of each of the plurality of content topics in the content pool comprises:

normalizing the number of content items in the content pool for each of the plurality of content topics with respect to a total number of content items in the content pool;

normalizing the level of interest of the set of users in each of the plurality of content topics with respect to the number of content items in the content pool classified as being related to each of the plurality of content topics; and calculating the ratio based on the normalized number of content items in the content pool related to each of the plurality of content topics and the normalized level of interest of the set of users in the each of the plurality of content topics to determine the level of representation of each of the plurality of content topics.

21. The medium of claim 16, wherein determining the level of interest of the set of users in each of the plurality of content topics comprises:

receiving, for each user included in the set of users, a user interest vector, wherein:

each attribute of the user interest vector corresponds to one of the plurality of content topics, and a value of each attribute of the user interest vector indicates whether a corresponding user is interested in a corresponding content topic determined based on user interaction information;

for each of the plurality of content topics:

extracting the value of the attribute associated with the content topic from the user interest vector of each user included in the set of users; and combining the value of the attribute associated with the content topic to determine the level of interest of the set of users in the content topics.

* * * * *